United States Patent
Araki

(10) Patent No.: US 11,926,746 B2
(45) Date of Patent: Mar. 12, 2024

(54) ACTIVE ENERGY RAY-CURABLE INK AND IMAGE RECORDING METHOD

(71) Applicant: FUJIFILM Corporation, Tokyo (JP)

(72) Inventor: Kenjiro Araki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 109 days.

(21) Appl. No.: 17/740,329

(22) Filed: May 9, 2022

(65) Prior Publication Data
US 2022/0267623 A1    Aug. 25, 2022

Related U.S. Application Data

(63) Continuation of application No. PCT/JP2020/040950, filed on Oct. 30, 2020.

(30) Foreign Application Priority Data

Nov. 11, 2019    (JP) ................. 2019-204276

(51) Int. Cl.
| | | |
|---|---|---|
| C09D 11/101 | (2014.01) | |
| B41J 11/00 | (2006.01) | |
| B41M 5/00 | (2006.01) | |
| C09D 11/30 | (2014.01) | |

(52) U.S. Cl.
CPC ....... C09D 11/101 (2013.01); B41J 11/00214 (2021.01); B41M 5/0023 (2013.01); C09D 11/30 (2013.01)

(58) Field of Classification Search
CPC ....... C09D 11/38; C09D 11/30; C09D 11/101; C09D 11/322; B41J 11/00214; B41M 5/0023
See application file for complete search history.

(56) References Cited

U.S. PATENT DOCUMENTS

| | | |
|---|---|---|
| 7,196,228 B2 | 3/2007 | Wolf et al. |
| 9,701,700 B2 | 7/2017 | Gruetzmacher et al. |
| 10,273,258 B2 | 4/2019 | Gruetzmacher et al. |
| 2009/0117343 A1 | 5/2009 | Nishida et al. |
| 2016/0039851 A1 | 2/2016 | Müller et al. |
| 2017/0240659 A1 | 8/2017 | Norcini et al. |
| 2019/0144695 A1 | 5/2019 | Loccufier |
| 2019/0177508 A1 | 6/2019 | Tsuyama et al. |
| 2019/0233617 A1 | 8/2019 | Zhou |

FOREIGN PATENT DOCUMENTS

| | | |
|---|---|---|
| CN | 1659175 | 8/2005 |
| CN | 101305060 | 11/2008 |
| CN | 103073658 | 5/2013 |
| CN | 104703995 | 6/2015 |
| CN | 107001400 | 8/2017 |
| CN | 107400144 | 11/2017 |
| JP | 2005529167 | 9/2005 |
| JP | 2012041441 | 3/2012 |
| JP | 2012180391 A * | 9/2012 |
| JP | 2014240464 | 12/2014 |
| JP | 2015063064 | 4/2015 |
| JP | 2015532275 | 11/2015 |
| JP | 2016510314 | 4/2016 |
| JP | 2017014310 | 1/2017 |
| JP | 2017105902 | 6/2017 |
| JP | 2017522364 | 8/2017 |
| JP | 6266073 | 1/2018 |
| WO | 03104245 | 12/2003 |
| WO | 2014053455 | 4/2014 |
| WO | 2015181332 | 12/2015 |
| WO | 2018047484 | 3/2018 |

(Continued)

OTHER PUBLICATIONS

Machine Translation of JP 2012180391 "Active Energy Ray Curable Ink Composition and Image Forming Method", Jun. 20, 2012, Abstract (Year: 2012).*
"International Search Report (Form PCT/ISA/210) of PCT/JP2020/040950," dated Jan. 12, 2021, with English translation thereof, pp. 1-6.
"Written Opinion of the International Searching Authority (Form PCT/ISA/237)" of PCT/JP2020/040950, dated Jan. 12, 2021, with English translation thereof, pp. 1-8.
"Office Action of China Counterpart Application", dated Mar. 31, 2023, with English translation thereof, p. 1-p. 18.
"Office Action of Japan Counterpart Application", dated May 9, 2023, with English translation thereof, p. 1-p. 9.
"Search Report of Europe Counterpart Application", dated Nov. 10, 2022, p. 1-p. 7.

(Continued)

*Primary Examiner* — Lisa Solomon
(74) *Attorney, Agent, or Firm* — JCIPRNET

(57) ABSTRACT

Provided are an active energy ray-curable ink including a photopolymerization initiator including a compound represented by Formula (1) and at least one of a monomer A composed of a photopolymerizable monomer having a molecular weight of 400 or more or a monomer B composed of a photopolymerizable monomer having a molecular weight of 130 or more and less than 400, and an image recording method. $L^1$ represents an organic group having 20 or less carbon atoms and a valence of n, and n represents an integer of 3 to 8. AO represents an alkyleneoxy group having 2 or 3 carbon atoms, and m represents an integer of 0 to 15. $L^2$ represents a single bond, an oxygen atom, a sulfur atom, or $—NR^{11}—$. $R^{11}$ represents a substituent. X represents an oxygen atom or a sulfur atom, and n $R^1$'s and n $R^2$'s each independently represent a substituent.

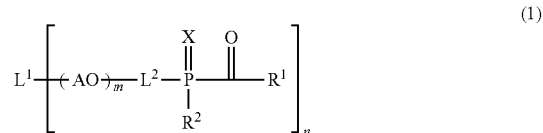

(1)

11 Claims, No Drawings

(56) References Cited

FOREIGN PATENT DOCUMENTS

| WO | 2019071428 | 4/2019 |
| WO | 2020049378 | 3/2020 |
| WO | 2020109132 | 6/2020 |

OTHER PUBLICATIONS

"Office Action of Japan Counterpart Application", dated Oct. 10, 2023, with English translation thereof, p. 1-p. 6.

* cited by examiner

ACTIVE ENERGY RAY-CURABLE INK AND IMAGE RECORDING METHOD

CROSS-REFERENCE TO RELATED APPLICATIONS

This application is a continuation application of International Application No. PCT/JP2020/040950, filed Oct. 30, 2020, the disclosure of which is incorporated herein by reference in its entirety. Further, this application claims priority from Japanese Patent Application No. 2019-204276, filed Nov. 11, 2019, the disclosure of which is incorporated herein by reference in its entirety.

BACKGROUND OF THE INVENTION

1. Field of the Invention

The present disclosure relates to an active energy ray-curable ink and an image recording method.

2. Description of the Related Art

Various studies have been conducted on a photo-curable composition and a photopolymerization initiator included in a photo-curable composition.

For example, JP2017-522364A discloses a photopolymerization initiator that does not diffuse or bleed from a cured resin. This photopolymerization initiator is a polyfunctional mono- or bis-acylphosphine oxide photopolymerization initiator that does not include a photo-curable ethylenic unsaturated group and is produced by the reaction between a polyfunctional compound including three or more reactive groups and a compound including a mono- or bis-acylphosphine oxide group.

JP2017-105902A discloses an active light-curable ink jet ink that forms a cured film from which its constituents are unlikely to precipitate on the surface thereof and that has good surface curability. This active light-curable ink jet ink includes a photopolymerizable compound, a photoinitiator, and a gelling agent. The photopolymerizable compound is substantially composed only of a polyfunctional photopolymerizable compound. The photoinitiator includes a compound having a specific structure.

SUMMARY OF THE INVENTION

When an image is recorded using an active energy ray-curable ink including a photopolymerizable monomer and a photopolymerization initiator (e.g., the active light-curable curable ink jet ink described in JP2017-105902A), the active energy ray-curable ink is applied onto a recording medium to form an ink film and the ink film is irradiated with an active energy ray (e.g., ultraviolet radiation).

In the above image recording method, the irradiation of the ink film with an active energy ray causes polymerization of the photopolymerizable monomer included in the ink film and, as a result, the ink film is cured to form an image.

An image recorded by the above image recording method may be required to have higher quality and higher adhesiveness to recording media.

Furthermore, there may be a demand for a reduction in the amount of photopolymerizable monomer that remains (hereinafter, also referred to as "residual monomer") in the image (i.e., an ink film that has been irradiated with an active energy ray).

An object of an aspect of the present disclosure is to provide an active energy ray-curable ink and an image recording method that can be used to record a high-quality image having high adhesiveness to recording media and containing a reduced amount of residual monomer.

Specific means for achieving the above object includes the following aspects.

<1> An active energy ray-curable ink including:
a photopolymerization initiator including a compound represented by Formula (1); and
at least one of a monomer A composed of a photopolymerizable monomer having a molecular weight of 400 or more or a monomer B composed of a photopolymerizable monomer having a molecular weight of 130 or more and less than 400,
wherein the monomer A is at least one selected from the group consisting of polyfunctional acrylates including at least one of an ethyleneoxy group, a propyleneoxy group, a trimethylolpropane skeleton, a glycerol skeleton, or a dipentaerythritol skeleton, and
wherein the monomer B is at least one selected from the group consisting of
a monofunctional acrylate including at least one of a heterocyclic skeleton, an aromatic ring skeleton, a chain alkyl group having 9 or more carbon atoms, a polyethyleneoxy group, or a polypropyleneoxy group,
an N-vinyl compound including one vinyl group,
a difunctional acrylate including at least one of a chain alkylene group having 5 or more carbon atoms, a polyethyleneoxy group, or a polypropyleneoxy group, and
a divinyl ether including at least one of a polyethyleneoxy group or a polypropyleneoxy group.

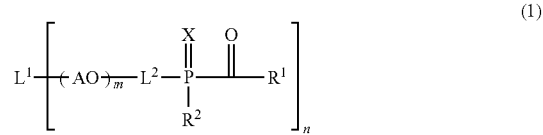

In Formula (1),
$L^1$ represents an organic group having 20 or less carbon atoms and a valence of n,
n represents an integer of 3 to 8,
AO represents an alkyleneoxy group having 2 or 3 carbon atoms,
m represents an integer of 0 to 15,
$L^2$ represents a single bond, an oxygen atom, a sulfur atom, or $-NR^{11}-$,
$R^{11}$ represents a hydrogen atom or an alkyl group having 1 to 3 carbon atoms,
X represents an oxygen atom or a sulfur atom,
n $R^1$'s each independently represent a phenyl group, a 2,6-dichlorophenyl group, a 2,4,6-trichlorophenyl group, a 2,6-dimethylphenyl group, a 2,4,6-trimethylphenyl group, a 2,6-diethylphenyl group, a 2,6-dimethoxyphenyl group, a 2,6-diethoxyphenyl group, an α-naphthyl group, a 2,6-dinitrophenyl group, a 2,6-dimethylcyclohexyl group, a 2,6-diethylcyclohexyl group, a 2,6-dimethoxycyclohexyl group, a 2,6-diethoxycyclohexyl group, a 2,6-dichlorocyclohexyl group, a tert-butyl group, a pentyl group, a hexyl group, a heptyl group, an octyl group, or a 2-ethylhexyl group, and n R²'s each independently represent R¹—(C=O)—, a methyl group, an ethyl group, a propyl group, an isopropyl group, an n-butyl group, a sec-butyl group, a tert-butyl group, a pentyl group, a hexyl group, a 2-ethylhexyl group, a phenyl group, a xylyl group, a 4-biphenyl group, a 2-chlorophenyl group, a 3-chlorophenyl group, a 4-chlorophenyl group, a 2,4-dichlorophenyl group, a 2-methylphenyl group, a 3-methylphenyl group, a 4-methylphenyl group, a 2-ethylphenyl group, a 3-ethylphenyl group, a 4-ethylphenyl group, a 2-methoxyphenyl group, a 3-methoxyphenyl group, a 4-methoxyphenyl group, a 2,4-dimethoxyphenyl group, a 2-ethoxyphenyl group, a 3-ethoxyphenyl group, a 4-ethoxyphenyl group, an α-naphthyl group, a methylnaphthyl group, a chloronaphthyl group, an ethoxynaphthyl group, a 2-nitrophenyl group, or a 4-nitrophenyl group.

<2> The active energy ray-curable ink described in <1>, including both of the monomers A and B.

<3> The active energy ray-curable ink described in <2>, wherein a mass ratio of a content of the monomer A to a total content of the monomers A and B is 0.10 to 0.70.

<4> The active energy ray-curable ink described in any one of <1> to <3>,
wherein the total content of the monomers A and B is 20% by mass or more of a total amount of the active energy ray-curable ink.

<5> The active energy ray-curable ink described in any one of <1> to <4>,
wherein the monomer A includes at least one selected from the group consisting of
ethyleneoxy-modified trimethylolpropane tetraacrylate,
propyleneoxy-modified trimethylolpropane tetraacrylate,
propyleneoxy-modified glycerol triacrylate,
polyethylene glycol diacrylate, and
dipentaerythritol hexaacrylate; and
wherein the monomer B includes at least one selected from the group consisting of
nonyl acrylate,
lauryl acrylate,
stearyl acrylate,
tetrahydrofurfuryl acrylate,
N-vinylcaprolactam,
cyclic trimethylolpropane formal acrylate,
phenoxyethyl acrylate,
3-methyl-1,5-pentanediol diacrylate,
propyleneoxy-modified neopentyl glycol diacrylate,
tripropylene glycol diacrylate, and
triethylene glycol divinyl ether.

<6> The active energy ray-curable ink described in any one of <1> to <5>, including the monomer A,
wherein the monomer A includes at least one selected from the group consisting of
ethyleneoxy-modified trimethylolpropane tetraacrylate,
propyleneoxy-modified trimethylolpropane tetraacrylate,
propyleneoxy-modified glycerol triacrylate, and
polyethylene glycol diacrylate.

<7> The active energy ray-curable ink described in any one of <1> to <6>, including the monomer B,
wherein the monomer B includes at least one selected from the group consisting of
N-vinylcaprolactam,
cyclic trimethylolpropane formal acrylate,
phenoxyethyl acrylate,
stearyl acrylate,
3-methyl-1,5-pentanediol diacrylate,
propyleneoxy-modified neopentyl glycol diacrylate,
tripropylene glycol diacrylate, and
triethylene glycol divinyl ether.

<8> The active energy ray-curable ink described in any one of <1> to <7>,
wherein a mass ratio of the total content of the monomers A and B to a content of the compound represented by Formula (1) is 2 to 20.

<9> The active energy ray-curable ink described in any one of <1> to <8>, further including:
a gelling agent that is at least one selected from the group consisting of an ester compound including a chain alkyl group having 12 or more carbon atoms and a ketone compound including a chain alkyl group having 12 or more carbon atoms.

<10> An image recording method including:
an application step of applying the active energy ray-curable ink described in any one of <1> to <9> to a recording medium to form an ink film; and
an irradiation step of irradiating the ink film with an active energy ray.

<11> The image recording method described in <10>,
wherein the irradiation step includes a substep of irradiating the ink film with the active energy ray in an atmosphere having an oxygen concentration of 5% by volume or less.

According to an aspect of the present disclosure, an active energy ray-curable ink and an image recording method that can be used to record a high-quality image having high adhesiveness to recording media and containing a reduced amount of residual monomer are provided.

DESCRIPTION OF THE PREFERRED EMBODIMENTS

In the present disclosure, a numerical range expressed using "to" means the range specified by the lower and upper limits described before and after "to", respectively.

In the present disclosure, in the case where a composition includes a plurality of substances that correspond to a component of the composition, the content of the component in the composition is the total content of the substances in the composition unless otherwise specified.

When numerical ranges are described in a stepwise manner in the present disclosure, the upper or lower limit of a numerical range may be replaced with the upper or lower limit of another numerical range, respectively, and may also be replaced with the values described in Examples below.

The term "step" used herein refers not only to an individual step but also to a step that is not distinguishable from other steps but achieves the intended purpose of the step.

In the present disclosure, a combination of preferable aspects is a more preferable aspect.

The term "light" used herein is a concept including active energy rays, such as γ-radiation, β-radiation, electron beams, ultraviolet radiation, and visible light.

Ultraviolet radiation may be referred to as "ultraviolet (UV) light".

The term "image" used herein refers to films formed using inks in general. The term "image recording" used herein refers to the formation of an image (i.e., a film).

The concept of the term "image" used herein includes a solid image.

The term "photopolymerizable monomer" used herein refers to a compound that includes a photopolymerizable group and is capable of polymerizing or crosslinking upon being irradiated with light (i.e., an active energy ray, such as γ-radiation, β-radiation, an electron beam, ultraviolet radiation, or visible light).

Examples of the photopolymerizable group include an ethylenic unsaturated group (i.e., a group including an ethylenic double bond), an epoxy group, and an oxetanyl group. Among these, an ethylenic unsaturated group is preferable.

The ethylenic unsaturated group is preferably an acryloyl group, a methacryloyl group, a vinyl group, or an allyl group and is more preferably an acryloyl group or a vinyl group.

In the present disclosure, the molecular weight of the photopolymerizable monomer is preferably 1,500 or less, is more preferably 1,000 or less, and is further preferably 800 or less.

The monomers A and B, which are photopolymerizable monomers, are described below.

Active Energy Ray-Curable Ink

An active energy ray-curable ink according to the present disclosure (hereinafter, also referred to simply as "ink") includes: a photopolymerization initiator including a compound represented by Formula (1); and at least one of a monomer A composed of a photopolymerizable monomer having a molecular weight of 400 or more or a monomer B composed of a photopolymerizable monomer having a molecular weight of 130 or more and less than 400.

The monomer A is at least one selected from the group consisting of polyfunctional acrylates including at least one of an ethyleneoxy group, a propyleneoxy group, a trimethylolpropane skeleton, a glycerol skeleton, or a dipentaerythritol skeleton.

The monomer B is at least one selected from the group consisting of
a monofunctional acrylate including at least one of a heterocyclic skeleton, an aromatic ring skeleton, a chain alkyl group having 9 or more carbon atoms, a polyethyleneoxy group, or a polypropyleneoxy group,
an N-vinyl compound including one vinyl group,
a difunctional acrylate including at least one of a chain alkylene group having 5 or more carbon atoms, a polyethyleneoxy group, or a polypropyleneoxy group, and
a divinyl ether including at least one of a polyethyleneoxy group or a polypropyleneoxy group.

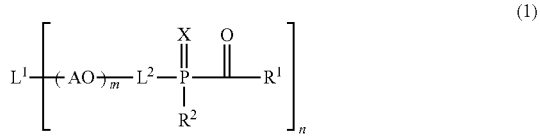
(1)

The meanings of the symbols used in Formula (1), such as $L^1$, will be described later.

The ink according to the present disclosure can be used to record a high-quality image having high adhesiveness to recording media (hereinafter, also referred to simply as "adhesiveness") and containing a reduced amount of residual monomer.

The reasons for which the above advantageous effects are produced are presumably as follows.

The ink according to the present disclosure is used in an image recording method including applying an ink onto a recording medium to form an ink film and irradiating the ink film with an active energy ray (e.g., ultraviolet radiation) to form an image. In this image recording method, the irradiation of the ink film with an active energy ray causes polymerization of a photopolymerizable monomer included in the ink film and, as a result, the ink film is cured to form an image.

The ink according to the present disclosure includes the above-described photopolymerization initiator in combination with at least one of the above-described monomer A or the above-described monomer B.

First, the advantageous effects produced when the ink according to the present disclosure includes the monomer A are described below.

The monomer A is at least one selected from the group consisting of photopolymerizable monomers having a molecular weight of 400 or more and is also at least one selected from the group consisting of polyfunctional acrylates including at least one of an ethyleneoxy group, a propyleneoxy group, a trimethylolpropane skeleton, a glycerol skeleton, or a dipentaerythritol skeleton.

That is, the monomer A is constituted by polyfunctional acrylates that are photopolymerizable monomers, and each of the polyfunctional acrylates constituting the monomer A has a molecular weight of 400 or more.

Such a monomer A advantageously has high polymerization reactivity in the latter part of a polymerization reaction.

However, since the molecular weight of the monomer A is high (i.e., a molecular weight of 400 or more), the mobility of the monomer A is poor. This is disadvantageous in that polymerization reactivity may be poor (particularly, in the former part of the polymerization reaction).

With regard to the above issues, an ink according to an aspect of the present disclosure which includes the monomer A allows the above disadvantages of the monomer A to be compensated for and the advantages of the monomer A to be produced by the action of the photopolymerization initiator including the compound represented by Formula (1). This will make it possible to record a high-quality image having high adhesiveness and containing a reduced amount of residual monomer.

The action of the photopolymerization initiator including the compound represented by Formula (1) is described below.

It is believed that, upon the ink film being irradiated with an active energy ray, a radical species (P) described below which includes n P radicals per molecule (where n represents an integer of 3 to 8; the same applies hereinafter) and n radical species (C) described below are produced from one molecule of the compound represented by Formula (1) above. The meanings of the symbols used for expressing the radical species (P) and (C) are the same as in Formula (1).

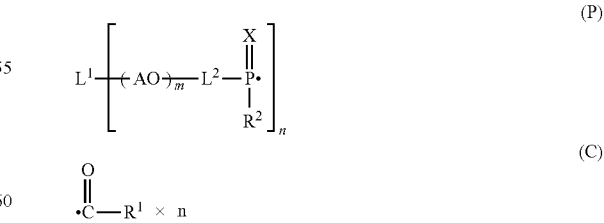

In an ink according to an aspect of the present disclosure which includes the monomer A, the radical species (P), which is a strong radical species including n P radicals per molecule, and the radical species (C), which can be produced from one molecule of the compound represented by Formula (1) with high efficiency (specifically, n radical species (C) are produced from one molecule of the compound represented by Formula (1)), enable the reaction of the monomer A to occur while compensating for the disadvantages of the monomer A and allow the advantages of the monomer A to be produced. This will make it possible to record a high-quality image having high adhesiveness and containing a reduced amount of residual monomer.

In contrast to the ink according to the aspect of the present disclosure which includes the monomer A, in the case where a comparative ink that includes the monomer A in combination with 2,4,6-trimethylbenzoyl diphenylphosphine oxide (e.g., "Omnirad TPO" produced by IGM Resins B.V.; hereinafter, also referred to as "TPO"), which is a common photopolymerization initiator, is used, only one radical species including one P radical per molecule and only one radical species including one C radical per molecule are produced from one molecule of TPO as described below. Therefore, due to the disadvantages of the monomer A, the polymerization reaction may fail to occur to a sufficient degree and, as a result, the quality and adhesiveness of the resulting image may be insufficient. Furthermore, it may be impossible to reduce the amount of the residual monomer.

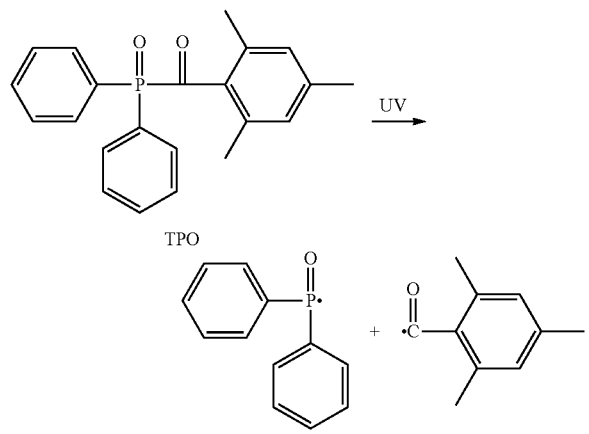

The advantageous effects of the ink according to the present disclosure which are produced when the ink includes the monomer B are described below.

The monomer B is at least one selected from the group consisting of photopolymerizable monomers having a molecular weight of 130 or more and less than 400 (i.e., having a lower molecular weight than the monomer A) and is also at least one selected from the group consisting of a monofunctional acrylate including at least one of a heterocyclic skeleton, an aromatic ring skeleton, a chain alkyl group having 9 or more carbon atoms, a polyethyleneoxy group, or a polypropyleneoxy group, a difunctional acrylate including at least one of a chain alkylene group having 5 or more carbon atoms, a polyethyleneoxy group, or a polypropyleneoxy group, an N-vinyl compound including one vinyl group, and a divinyl ether including at least one of a polyethyleneoxy group or a polypropyleneoxy group.

That is, the monomer B is constituted by specific monofunctional or difunctional photopolymerizable monomers, and each of the photopolymerizable monomers constituting the monomer B has a molecular weight of 130 or more and less than 400.

Since the monomer B has a low molecular weight (i.e., a molecular weight of 130 or more and less than 400) and high mobility, it has high polymerization reactivity.

However, since the monomer B has a low molecular weight and is a monofunctional or difunctional photopolymerizable monomer, only one or two radicals are produced from one monomer molecule. This is disadvantageous in that the length of polymer chains formed by the polymerization may be short.

With regard to the above issues, an ink according to an aspect of the present disclosure which includes the monomer B allows the above disadvantages of the monomer B to be compensated for and long polymer chains to be formed by polymerization by the action of the photopolymerization initiator including the compound represented by Formula (1) (specifically, by the actions of the radical species (P) and (C) described above). Furthermore, the advantages of the monomer B (i.e., high polymerization reactivity) can be produced. This will make it possible to record a high-quality image having high adhesiveness and containing a reduced amount of residual monomer.

In contrast to the ink according to the aspect of the present disclosure which includes the monomer B, in the case where a comparative ink that includes the monomer B in combination with TPO is used, as described above, only one radical species (C) is produced from one molecule of TPO. Moreover, the radical species (P) is not produced; instead of the radical species (P), a radical species including one P radical per molecule is formed. Therefore, due to the disadvantages of the monomer B, the length of the polymer chains formed by polymerization may be short and, as a result, the quality and adhesiveness of the resulting image may be insufficient. Furthermore, it may be impossible to reduce the amount of the residual monomer.

It is believed that, for the above reasons, the ink according to the present disclosure can be used to record a high-quality image having high adhesiveness to recording media and containing a reduced amount of residual monomer.

Note that the ink according to the present disclosure is not limited by the above-described reasons.

The application of the ink according to the present disclosure is not limited.

Since the ink according to the present disclosure can be used to record an image having high adhesiveness to recording media and containing a reduced amount of residual monomer, the ink according to the present disclosure is suitably used for, for example, recording an image on food packaging materials, which serve as recording media.

The expression "high-quality image" used herein means that the graininess of the image is low (i.e., the image is excellent in terms of graininess).

In order to produce the above-described advantageous effects of the ink according to the present disclosure, it is sufficient that the ink according to the present disclosure include at least one of the monomer A or the monomer B.

In order to produce the advantageous effects of the ink according to the present disclosure more effectively, it is preferable that the ink according to the present disclosure include both monomers A and B.

In the case where the ink according to the present disclosure includes both monomers A and B, both of the advantages of the monomer A (i.e., high polymerization reactivity in the latter part of a polymerization reaction) and the advantages of the monomer B (i.e., high polymerization reactivity) are achieved and, therefore, the advantageous effects of the ink according to the present disclosure may be produced more effectively.

In the case where the ink according to the present disclosure includes both monomers A and B, the monomer A contributes to all of the improvement of image quality and adhesiveness and the reduction in the amount of the residual monomer.

In the case where the ink according to the present disclosure includes both monomers A and B, the monomer B contributes particularly to the improvement of image quality.

Each of the constituents that can be contained in the ink according to the present disclosure is described below.

Monomer A

The ink according to the present disclosure includes at least one of the monomer A or the monomer B.

The monomer A is at least one selected from the group consisting of photopolymerizable monomers having a molecular weight of 400 or more.

The molecular weight of each of the photopolymerizable monomers (i.e., the polyfunctional acrylates described below) constituting the monomer A is preferably 400 to 1,000, is more preferably 400 to 800, and is further preferably 400 to 600.

The monomer A is at least one selected from the group consisting of polyfunctional acrylates including at least one of an ethyleneoxy group, a propyleneoxy group, a trimethylolpropane skeleton, a glycerol skeleton, or a dipentaerythritol skeleton.

The term "polyfunctional acrylate" used herein refers to a compound including two or more acryloyl groups per molecule.

Therefore, each of the polyfunctional acrylates included in the monomer A includes at least one of an ethyleneoxy group, a propyleneoxy group, a trimethylolpropane skeleton, a glycerol skeleton, or a dipentaerythritol skeleton and two or more acryloyl groups per molecule and has a molecular weight of 400 or more (preferably 400 to 1,000, more preferably 400 to 800, and further preferably 400 to 600).

The polyfunctional acrylates constituting the monomer A are preferably difunctional to hexafunctional acrylates and are more preferably difunctional or trifunctional acrylates in order to further enhance the adhesiveness of the image.

In order to further enhance the adhesiveness of the image, the polyfunctional acrylates constituting the monomer A preferably include
at least one of an ethyleneoxy group or a propyleneoxy group,
more preferably at least one of two or more ethyleneoxy groups or two or more propyleneoxy groups, and
further preferably at least one of three or more ethyleneoxy groups or three or more propyleneoxy groups.

Examples of the polyfunctional acrylates included in the monomer A include:
a polyfunctional acrylate that includes a trimethylolpropane skeleton and that may include at least one of an ethyleneoxy group or a propyleneoxy group;
a polyfunctional acrylate that includes a glycerol skeleton and that may include at least one of an ethyleneoxy group or a propyleneoxy group;
a polyfunctional acrylate that includes a dipentaerythritol skeleton and that may include at least one of an ethyleneoxy group or a propyleneoxy group; and
a polyfunctional acrylate that includes at least one of a polyethyleneoxy group (i.e., a group having a structure including two or more ethyleneoxy groups serving as repeating units) or a polypropyleneoxy group (i.e., a group having a structure including two or more propyleneoxy groups serving as repeating units).

Examples of the polyfunctional acrylate that includes a trimethylolpropane skeleton and that may include at least one of an ethyleneoxy group or a propyleneoxy group include
trimethylolpropane tetraacrylate,
ethyleneoxy-modified trimethylolpropane tetraacrylate, and
propyleneoxy-modified trimethylolpropane tetraacrylate.
Among these,
ethyleneoxy-modified trimethylolpropane tetraacrylate and propyleneoxy-modified trimethylolpropane tetraacrylate are preferable.

The term "ethyleneoxy-modified" used herein refers to including at least one ethyleneoxy group per molecule. The term "propyleneoxy-modified" used herein refers to including at least one propyleneoxy group per molecule.

An ethyleneoxy-modified compound is preferably a compound including two or more ethyleneoxy groups per molecule and is more preferably a compound including three or more ethyleneoxy groups per molecule.

A propyleneoxy-modified compound is preferably a compound including two or more propyleneoxy groups per molecule and is more preferably a compound including three or more propyleneoxy groups per molecule.

Examples of the polyfunctional acrylate that includes a glycerol skeleton and that may include at least one of an ethyleneoxy group or a propyleneoxy group include
glycerol triacrylate,
ethyleneoxy-modified glycerol triacrylate, and
propyleneoxy-modified glycerol triacrylate.
Among these,
ethyleneoxy-modified glycerol triacrylate and propyleneoxy-modified glycerol triacrylate are preferable.

Examples of the polyfunctional acrylate that includes a dipentaerythritol skeleton and that may include at least one of an ethyleneoxy group or a propyleneoxy group include
dipentaerythritol hexaacrylate,
dipentaerythritol pentaacrylate,
ethyleneoxy-modified dipentaerythritol hexaacrylate,
propyleneoxy-modified dipentaerythritol hexaacrylate,
ethyleneoxy-modified dipentaerythritol pentaacrylate, and
propyleneoxy-modified dipentaerythritol pentaacrylate.
Among these,
ethyleneoxy-modified dipentaerythritol hexaacrylate,
propyleneoxy-modified dipentaerythritol hexaacrylate,
ethyleneoxy-modified dipentaerythritol pentaacrylate, and
propyleneoxy-modified dipentaerythritol pentaacrylate are preferable.

Examples of the polyfunctional acrylate that includes at least one of a
polyethyleneoxy group or a polypropyleneoxy group include
polyethylene glycol diacrylate, and polypropylene glycol diacrylate.

In order to achieve the advantageous effects of the ink according to the present disclosure more effectively, the monomer A preferably includes at least one selected from the group consisting of
ethyleneoxy-modified trimethylolpropane tetraacrylate,
propyleneoxy-modified trimethylolpropane tetraacrylate,
propyleneoxy-modified glycerol triacrylate,
polyethylene glycol diacrylate, and
dipentaerythritol hexaacrylate (hereinafter, also referred to as "monomer A1").

In such a case, the proportion of the monomer A1 to the monomer A is preferably 50% to 100% by mass, is more preferably 60% to 100% by mass, and is further preferably 80% to 100% by mass.

In order to further enhance the adhesiveness of the image, the monomer A more preferably includes at least one selected from the group consisting of
ethyleneoxy-modified trimethylolpropane tetraacrylate,
propyleneoxy-modified trimethylolpropane tetraacrylate,
propyleneoxy-modified glycerol triacrylate, and
polyethylene glycol diacrylate
(hereinafter, also referred to as "monomer A2").

In such a case, the proportion of the monomer A2 to the monomer A is preferably 50% to 100% by mass, is more preferably 60% to 100% by mass, and is further preferably 80% to 100% by mass.

Monomer B

As described above, the ink according to the present disclosure includes at least one of the monomer A or the monomer B.

The monomer B is at least one selected from the group consisting of photopolymerizable monomers having a molecular weight of 130 or more and less than 400.

The molecular weight of each of the photopolymerizable monomers (i.e., the monofunctional or difunctional photopolymerizable monomers described below) constituting the monomer B is preferably 130 to 380, is more preferably 130 to 350, and is further preferably 130 to 330.

The monomer B is at least one selected from the group consisting of
a monofunctional acrylate including at least one of a heterocyclic skeleton, an aromatic ring skeleton, a chain alkyl group having 9 or more carbon atoms, a polyethyleneoxy group, or a polypropyleneoxy group;
an N-vinyl compound including one vinyl group,
a difunctional acrylate including at least one of a chain alkylene group having 5 or more carbon atoms, a polyethyleneoxy group, or a polypropyleneoxy group, and
a divinyl ether including at least one of a polyethyleneoxy group or a polypropyleneoxy group.

The term "monofunctional acrylate" used herein refers to a compound including only one acryloyl group per molecule, and the term "difunctional acrylate" used herein refers to a compound including only two acryloyl groups per molecule.

The term "chain alkyl group" used herein refers to a linear or branched alkyl group, and the term "chain alkylene group" used herein refers to a linear or branched alkylene group.

The compounds constituting the monomer B are all monofunctional or difunctional photopolymerizable monomers.

The term "monofunctional or difunctional photopolymerizable monomer" used herein refers to a compound that includes only one or two photopolymerizable groups (specifically, acryloyl groups or vinyl groups) in total.

Examples of the monomer B include:
a monofunctional acrylate including a heterocyclic skeleton;
a monofunctional acrylate including an aromatic ring skeleton;
a monofunctional acrylate including a chain alkyl group having 9 or more carbon atoms (preferably 9 to 20 carbon atoms);
a monofunctional acrylate including a polyethyleneoxy group (i.e., a group having a structure including two or more ethyleneoxy groups serving as repeating units; the same applies hereinafter);
a monofunctional acrylate including a polypropyleneoxy group (i.e., a group having a structure including two or more propyleneoxy groups serving as repeating units; the same applies hereinafter);
an N-vinyl compound including one N-vinyl group and a nitrogen-containing hetero ring;
a difunctional acrylate including a chain alkylene group having 5 or more carbon atoms (preferably 5 to 20 carbon atoms);
a difunctional acrylate including a polyethyleneoxy group;
a difunctional acrylate including a polypropyleneoxy group;
a divinyl ether including a polyethyleneoxy group; and
a divinyl ether including a polypropyleneoxy group.

Examples of the monofunctional acrylate including a heterocyclic skeleton include
tetrahydrofurfuryl acrylate, and
cyclic trimethylolpropane formal acrylate.

Examples of the monofunctional acrylate including an aromatic ring skeleton include
phenoxyethyl acrylate, and
benzyl acrylate.

Examples of the monofunctional acrylate including a chain alkyl group having 9 or more carbon atoms (preferably 9 to 20 carbon atoms) include
nonyl acrylate,
lauryl acrylate, and
stearyl acrylate.

Examples of the monofunctional acrylate including a polyethyleneoxy group include
polyethylene glycol acrylate, and
methoxypolyethylene glycol acrylate.

Examples of the monofunctional acrylate including a polypropyleneoxy group include
polypropylene glycol acrylate, and
methoxypolypropylene glycol acrylate.

Examples of the N-vinyl compound including one N-vinyl group and a nitrogen-containing hetero ring include
N-vinylcaprolactam, and
N-vinylpyrrolidone.

Examples of the difunctional acrylate including a chain alkylene group having 5 or more carbon atoms (preferably 5 to 20 carbon atoms) include
3-methyl-1,5-pentanediol diacrylate, and
propyleneoxy-modified neopentyl glycol diacrylate.

Examples of the difunctional acrylate including a polyethyleneoxy group include polyethylene glycol diacrylate.

Examples of the difunctional acrylate including a polypropyleneoxy group include polypropylene glycol diacrylate (e.g., tripropylene glycol diacrylate).

Examples of the divinyl ether including a polyethyleneoxy group include polyethylene glycol divinyl ether (e.g., triethylene glycol divinyl ether).

Examples of the divinyl ether including a polypropyleneoxy group include polypropylene glycol divinyl ether.

The monomer B preferably includes a difunctional photopolymerizable monomer (e.g., at least one of the above-described difunctional acrylate or the above-described divinyl ether) and more preferably includes both a monofunctional photopolymerizable monomer (e.g., at least one of the above-described monofunctional acrylate or the above-described N-vinyl compound) and a difunctional photopolymerizable monomer.

In order to achieve the advantageous effects of the ink according to the present disclosure more effectively, the monomer B preferably includes at least one selected from the group consisting of
nonyl acrylate,
lauryl acrylate,
stearyl acrylate,
tetrahydrofurfuryl acrylate,
N-vinylcaprolactam,
cyclic trimethylolpropane formal acrylate,
phenoxyethyl acrylate,
3-methyl-1,5-pentanediol diacrylate,
propyleneoxy-modified neopentyl glycol diacrylate,
tripropylene glycol diacrylate, and
triethylene glycol divinyl ether In such a case, the proportion of the monomer B1 to the monomer B is preferably 50% to 100% by mass, is more preferably 60% to 100% by mass, and is further preferably 80% to 100% by mass.

In order to further reduce the amount of the residual monomer, the monomer B more preferably includes at least one selected from the group consisting of
N-vinylcaprolactam,
cyclic trimethylolpropane formal acrylate,
phenoxyethyl acrylate,
stearyl acrylate,
3-methyl-1,5-pentanediol diacrylate,
propyleneoxy-modified neopentyl glycol diacrylate,
tripropylene glycol diacrylate, and
triethylene glycol divinyl ether
(hereinafter, also referred to as "monomer B2").

In such a case, the proportion of the monomer B2 to the monomer B is preferably 50% to 100% by mass, is more preferably 60% to 100% by mass, and is further preferably 80% to 100% by mass.

Preferable Photopolymerizable Monomers

As described above, it is sufficient that the ink according to the present disclosure include at least one of the above-described monomer A or the above-described monomer B as a photopolymerizable monomer.

The ink according to the present disclosure may include a monomer other than the monomer A or B (e.g., a photopolymerizable monomer having a molecular weight of less than 130, such as dimethylacrylamide).

The total content of the monomers A and B in the ink according to the present disclosure is preferably 20% by mass or more, is more preferably 30% by mass or more, is further preferably 50% by mass or more, and is further preferably 60% by mass or more of the total amount of the ink.

The upper limit for the total content of the monomers A and B is set appropriately in accordance with the content of the other constituents, such as a photopolymerization initiator. The upper limit for the total content of the monomers A and B is preferably 95% by mass and is more preferably 90% by mass.

The total content of the monomers A and B in the ink according to the present disclosure is preferably 30% to 100% by mass, is more preferably 50% to 100% by mass, and is further preferably 80% to 100% by mass of the total amount of the photopolymerizable monomer included in the ink.

As described above, in order to achieve the advantageous effects of the ink according to the present disclosure more effectively, the ink according to the present disclosure preferably includes both monomers A and B.

In the case where the ink according to the present disclosure includes both monomers A and B, the mass ratio of the content of the monomer A to the total content of the monomers A and B (hereinafter, "mass ratio [A/(A+B)]") is preferably 0.10 to 0.80, is more preferably 0.10 to 0.70, is further preferably 0.20 to 0.60, and is further preferably 0.20 to 0.50.

When the mass ratio [A/(A+B)] is 0.10 or more, image quality and adhesiveness are further enhanced. Furthermore, the amount of the residual monomer is further reduced.

When the mass ratio [A/(A+B)] is 0.80 or less, image quality is further enhanced.

The mass ratio of the total content of the monomers A and B to the content of the compound represented by Formula (1) (hereinafter, also referred to as "mass ratio [(A+B)/(1)]") is preferably 1 to 90, is more preferably 1.5 to 30, is further preferably 2 to 20, is further preferably 3 to 20, is further preferably 4 to 20, and is further preferably 5 to 20.

When the mass ratio [(A+B)/(1)] is 1 or more, the amount of the residual monomer is further reduced.

When the mass ratio [(A+B)/(1)] is 90 or less, image quality and adhesiveness are further enhanced and the amount of the residual monomer is further reduced.

The ink according to the present disclosure is preferably an ink jet ink.

In such a case, in order to enhance the ink discharge performance of an ink jet head, the total content of monofunctional and difunctional photopolymerizable monomers in the ink according to the present disclosure is preferably 15% by mass or more, is more preferably 25% by mass or more, is further preferably 30% by mass or more, and is further preferably 40% by mass or more of the total amount of the ink.

The upper limit for the total content of the monofunctional and difunctional photopolymerizable monomers is not set and may be, for example, 95% by mass or 90% by mass.

The proportion of the total content of the monofunctional and difunctional photopolymerizable monomers to the total content of the photopolymerizable monomers included in the ink is preferably 20% by mass or more, is more preferably 30% by mass or more, is further preferably 40% by mass or more, and is further preferably 50% by mass or more.

The upper limit for the proportion of the total content of the monofunctional and difunctional photopolymerizable monomers is not set and may be, for example, 100% by mass, 95% by mass, or 90% by mass.

The content of the photopolymerizable monomers included in the ink is preferably 50% by mass or more, is more preferably 60% by mass or more, and is further preferably 70% by mass or more of the total amount of the ink.

The upper limit for the content of the photopolymerizable monomers relative to the total amount of the ink is not set and may be, for example, 90% by mass.

Photopolymerization Initiator

The ink according to the present disclosure contains a photopolymerization initiator including a compound represented by Formula (1).

The photopolymerization initiator may include only one compound represented by Formula (1) or two or more compounds represented by Formula (1).

The photopolymerization initiator may also include a compound other than the compound represented by Formula (1) (e.g., a common photopolymerization initiator known in the related art).

Compound Represented by Formula (1)

The compound represented by Formula (1) is described below.

In the present disclosure, the compound represented by Formula (1) may be referred to as "specific initiator" or "compound (1)".

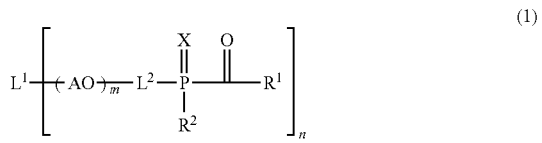

(1)

In Formula (1), $L^1$ represents an organic group having 20 or less carbon atoms and a valence of n, n represents an integer of 3 to 8, AO represents an alkyleneoxy group having 2 or 3 carbon atoms, m represents an integer of 0 to 15, $L^2$ represents a single bond, an oxygen atom, a sulfur atom, or —$NR^{11}$—, $R^{11}$ represents a hydrogen atom or an alkyl group having 1 to 3 carbon atoms, X represents an oxygen atom or a sulfur atom, n $R^1$'s each independently represent a phenyl group, a 2,6-dichlorophenyl group, a 2,4,6-trichlorophenyl group, a 2,6-dimethylphenyl group, a 2,4,6-trimethylphenyl group, a 2,6-diethylphenyl group, a 2,6-dimethoxyphenyl group, a 2,6-diethoxyphenyl group, an α-naphthyl group, a 2,6-dinitrophenyl group, a 2,6-dimethylcyclohexyl group, a 2,6-diethylcyclohexyl group, a 2,6-dimethoxycyclohexyl group, a 2,6-diethoxycyclohexyl group, a 2,6-dichlorocyclohexyl group, a tert-butyl group, a pentyl group, a hexyl group, a heptyl group, an octyl group, or a 2-ethylhexyl group, and n $R^2$'s each independently represent $R^1$—(C=O)—, a methyl group, an ethyl group, a propyl group, an isopropyl group, an n-butyl group, a sec-butyl group, a tert-butyl group, a pentyl group, a hexyl group, a 2-ethylhexyl group, a phenyl group, a xylyl group, (i.e., a 2,3-dimethylphenyl group, a 2,4-dimethylphenyl group, a 2,5-dimethylphenyl group, a 2,6-dimethylphenyl group, a 3,4-dimethylphenyl group, or a 3,5-dimethylphenyl group), a 4-biphenyl group, a 2-chlorophenyl group, a 3-chlorophenyl group, a 4-chlorophenyl group, a 2,4-dichlorophenyl group, a 2-methylphenyl group, a 3-methylphenyl group, a 4-methylphenyl group, a 2-ethylphenyl group, a 3-ethylphenyl group, a 4-ethylphenyl group, a 2-methoxyphenyl group, a 3-methoxyphenyl group, a 4-methoxyphenyl group, a 2,4-dimethoxyphenyl group, a 2-ethoxyphenyl group, a 3-ethoxyphenyl group, a 4-ethoxyphenyl group, an α-naphthyl group, a methylnaphthyl group, a chloronaphthyl group, an ethoxynaphthyl group, a 2-nitrophenyl group, or a 4-nitrophenyl group.

In Formula (1), $L^1$ represents an organic group having 20 or less carbon atoms and a valence of n, and n represents an integer of 3 to 8.

Preferably, n is an integer of 3 to 6.

Examples of the organic group having 20 or less carbon atoms and a valence of n which is represented by $L^1$ include:

a hydrocarbon group (preferably a chain hydrocarbon group) having a valence of n;

a group formed by replacing at least one carbon atom included in a hydrocarbon group (preferably a chain hydrocarbon group) having a valence of n with a hetero atom (preferably an oxygen atom, a nitrogen atom, or a sulfur atom); and a group formed by replacing at least one hydrogen atom included in a hydrocarbon group having a valence of n with a hydroxyl group, a thiol group, or an amino group.

The organic group having 20 or less carbon atoms and a valence of n which is represented by $L^1$ may include a ring structure but preferably does not include a ring structure.

The number of carbon atoms included in the organic group having 20 or less carbon atoms and a valence of n which is represented by $L^1$ is preferably 1 to 20, is more preferably 3 to 20, and is further preferably 3 to 10.

Specific examples of $L^1$ (i.e., the organic group having 20 or less carbon atoms and a valence of n) are described below. Note that $L^1$ is not limited to the following examples. In the specific examples below, the symbol * represents a bonding position.

(L1-1)

(L1-2)

(L1-3)

(L1-4)

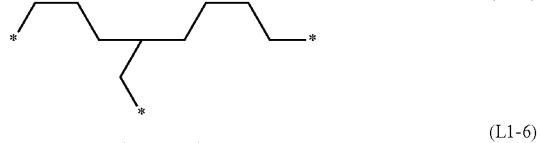

(L1-5)

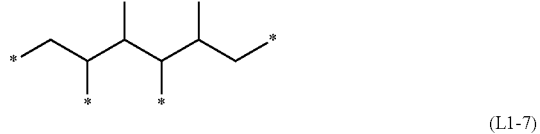

(L1-6)

(L1-7)

-continued (L1-8)

*—CH2CH2—N(—*)—CH2CH2—*

(L1-9)

*—CH2CH2—N(—CH2CH2—*)—CH2CH2—*

(L1-10)

*—CH2CH2CH2—N(—*)—CH2CH2—*

(L1-11)

[Structure: pentaerythritol tetrapropionate-type branched structure with four *—CH2CH2—C(=O)—O— arms connected to a central carbon]

In Formula (1), AO represents an alkyleneoxy group having 2 or 3 carbon atoms, and m represents an integer of 0 to 15.

In Formula (1), when m is 0, $L^1$ and $L^2$ are directly bonded to each other. In such a case, when $L^2$ is a single bond, $L^1$ and P (phosphorus atom) are directly bonded to each other.

In Formula (1), m represents an integer of 0 to 15.

In order to further reduce the amount of the residual monomer, m is preferably an integer of 0 to 10, is more preferably an integer of 0 to 5, is further preferably an integer of 0 to 3, and is further preferably 0 or 1.

In Formula (1), $L^2$ represents a single bond, an oxygen atom (i.e., —O—), a sulfur atom (i.e., —S—), or —$NR^{11}$—, and $R^{11}$ represents a hydrogen atom or an alkyl group having 1 to 3 carbon atoms.

$R^{11}$ is preferably a hydrogen atom, a methyl group, or an ethyl group, is more preferably a hydrogen atom or a methyl group, and is further preferably a hydrogen atom.

In order to further reduce the amount of the residual monomer, $L^2$ is preferably an oxygen atom or a sulfur atom.

In Formula (1), X represents an oxygen atom (i.e., =O) or a sulfur atom (i.e., =S).

X is preferably an oxygen atom.

In Formula (1), n $R^1$'s each independently represent a phenyl group, a 2,6-dichlorophenyl group, a 2,4,6-trichlorophenyl group, a 2,6-dimethylphenyl group, a 2,4,6-trimethylphenyl group, a 2,6-diethylphenyl group, a 2,6-dimethoxyphenyl group, a 2,6-diethoxyphenyl group, an α-naphthyl group, a 2,6-dinitrophenyl group, a 2,6-dimethylcyclohexyl group, a 2,6-diethylcyclohexyl group, a 2,6-dimethoxycyclohexyl group, a 2,6-diethoxycyclohexyl group, a 2,6-dichlorocyclohexyl group, a tert-butyl group, a pentyl group, a hexyl group, a heptyl group, an octyl group, or a 2-ethylhexyl group.

In order to further reduce the amount of the residual monomer, n $R^1$'s preferably each independently represent
  a phenyl group, a 2,6-dichlorophenyl group, a 2,4,6-trichlorophenyl group, a 2,6-dimethylphenyl group, a 2,4,6-trimethylphenyl group, a 2,6-diethylphenyl group, a 2,6-dimethoxyphenyl group, a 2,6-diethoxyphenyl group, an α-naphthyl group, a 2,6-dinitrophenyl group, a 2,6-dimethylcyclohexyl group, a 2,6-diethylcyclohexyl group, a 2,6-dimethoxycyclohexyl group, a 2,6-diethoxycyclohexyl group, or a 2,6-dichlorocyclohexyl group;
  more preferably a phenyl group, a 2,6-dichlorophenyl group, a 2,4,6-trichlorophenyl group, a 2,6-dimethylphenyl group, a 2,4,6-trimethylphenyl group, a 2,6-diethylphenyl group, a 2,6-dimethoxyphenyl group, a 2,6-diethoxyphenyl group, an α-naphthyl group, or a 2,6-dinitrophenyl group;
  further preferably a phenyl group, a 2,6-dichlorophenyl group, a 2,4,6-trichlorophenyl group, a 2,6-dimethylphenyl group, a 2,4,6-trimethylphenyl group, a 2,6-diethylphenyl group, a 2,6-dimethoxyphenyl group, a 2,6-diethoxyphenyl group, or a 2,6-dinitrophenyl group; and further preferably a phenyl group, a 2,6-dimethylphenyl group, a 2,4,6-trimethylphenyl group, or a 2,6-diethylphenyl group.

In Formula (1), n $R^2$'s each independently represent $R^1$—(C=O)—, a methyl group, an ethyl group, a propyl group, an isopropyl group, an n-butyl group, a sec-butyl group, a tert-butyl group, a pentyl group, a hexyl group, a 2-ethylhexyl group, a phenyl group, a xylyl group (i.e., a 2,3-dimethylphenyl group, a 2,4-dimethylphenyl group, a 2,5-dimethylphenyl group, a 2,6-dimethylphenyl group, a 3,4-dimethylphenyl group, or a 3,5-dimethylphenyl group), a 4-biphenyl group, a 2-chlorophenyl group, a 3-chlorophenyl group, a 4-chlorophenyl group, a 2,4-dichlorophenyl group, a 2-methylphenyl group, a 3-methylphenyl group, a 4-methylphenyl group, a 2-ethylphenyl group, a 3-ethylphenyl group, a 4-ethylphenyl group, a 2-methoxyphenyl group, a 3-methoxyphenyl group, a 4-methoxyphenyl group, a 2,4-dimethoxyphenyl group, a 2-ethoxyphenyl group, a 3-ethoxyphenyl group, a 4-ethoxyphenyl group, an α-naphthyl group, a methylnaphthyl group, a chloronaphthyl group, an ethoxynaphthyl group, a 2-nitrophenyl group, or a 4-nitrophenyl group.

Note that $R^1$ in $R^1$—(C=O)— has the same meaning as $R^1$ in Formula (1) above. Preferable examples of $R^1$ in $R^1$—(C=O)— are also the same as those of $R^1$ in Formula (1). $R^1$ in $R^1$—(C=O)— may be identical to or different from $R^1$ in Formula (1).

In order to further reduce the amount of the residual monomer, n $R^2$'s preferably each independently represent
  a phenyl group, a xylyl group, a 4-biphenyl group, a 2-chlorophenyl group, a 3-chlorophenyl group, a 4-chlorophenyl group, a 2,4-dichlorophenyl group, a 2-methylphenyl group, a 3-methylphenyl group, a 4-methylphenyl group, a 2-ethylphenyl group, a 3-ethylphenyl group, a 4-ethylphenyl group, a 2-methoxyphenyl group, a 3-methoxyphenyl group, a 4-methoxyphenyl group, a 2,4-dimethoxyphenyl group, a 2-ethoxyphenyl group, a 3-ethoxyphenyl group, a 4-ethoxyphenyl group, an α-naphthyl group, a methylnaphthyl group, a chloronaphthyl group, an ethoxynaphthyl group, a 2-nitrophenyl group, or a 4-nitrophenyl group; and
  further preferably a phenyl group, a xylyl group, a 2-methylphenyl group, a 3-methylphenyl group, a 4-methylphenyl group, a 2-ethylphenyl group, a 3-ethylphenyl group, or a 4-ethylphenyl group.

The molecular weight of the compound represented by Formula (1) is preferably 500 or more, is more preferably 500 to 3,000, is further preferably 700 to 2,500, and is further preferably 900 to 2,100.

Specific examples (P initiators 1 to 17) of the compound represented by Formula (1) are described below. Note that the compound represented by Formula (1) is not limited to the following specific examples.

The specific examples are described together with the respective molecular weights (Mw).

P initiator 1

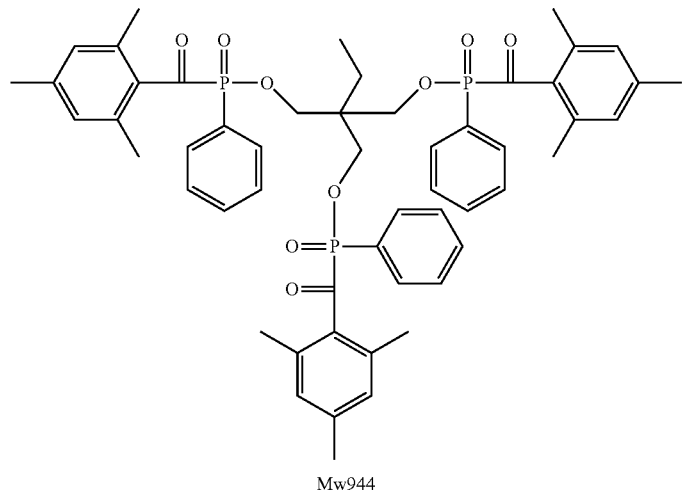

Mw944

P initiator 2

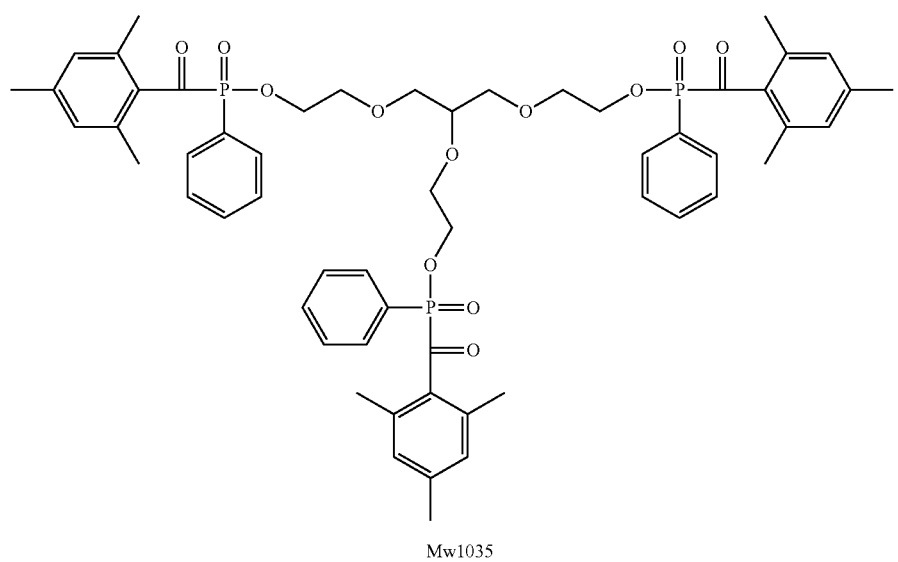

Mw1035

-continued
P initiator 3
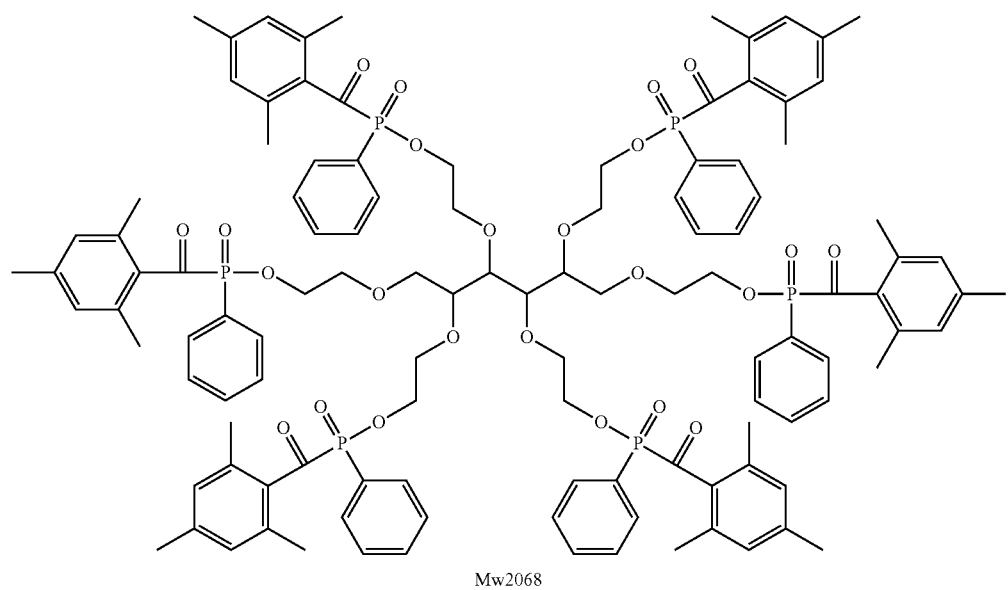
Mw2068
P initiator 4
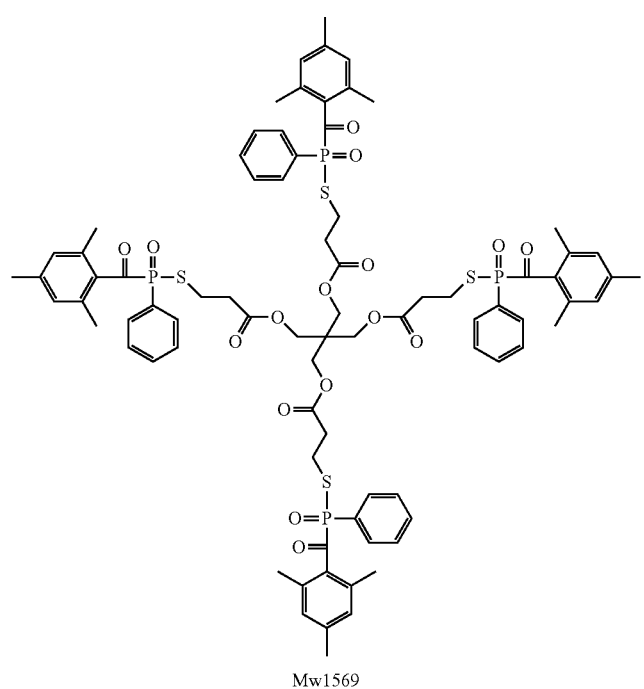
Mw1569

P initiator 5
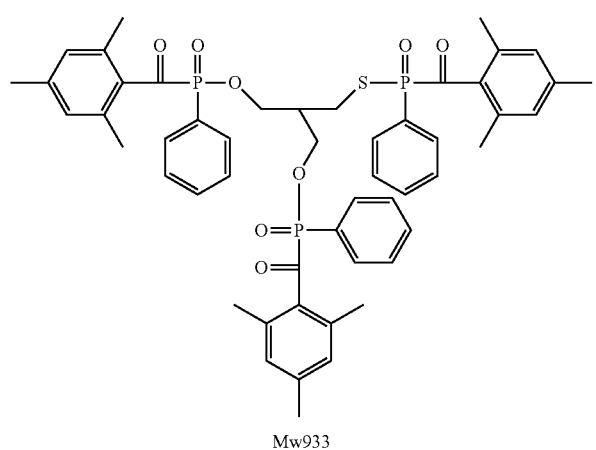
Mw933
P initiator 6
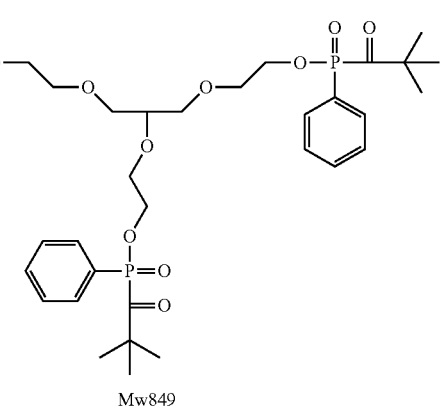
Mw849
P initiator 7
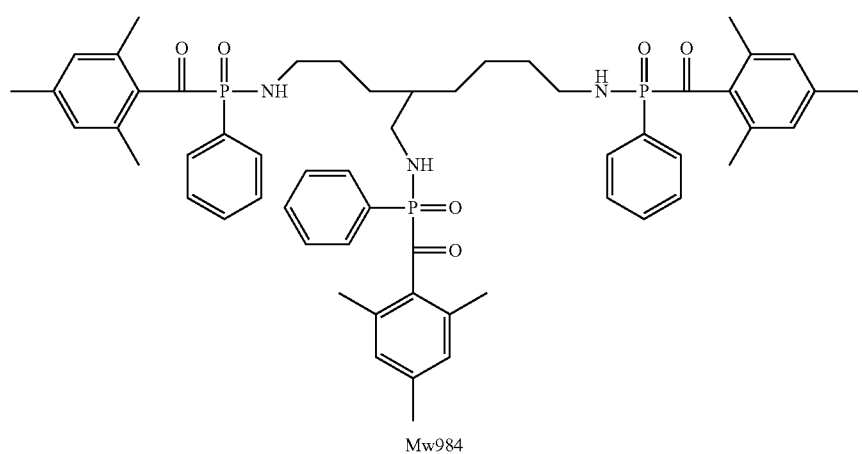
Mw984
P initiator 8
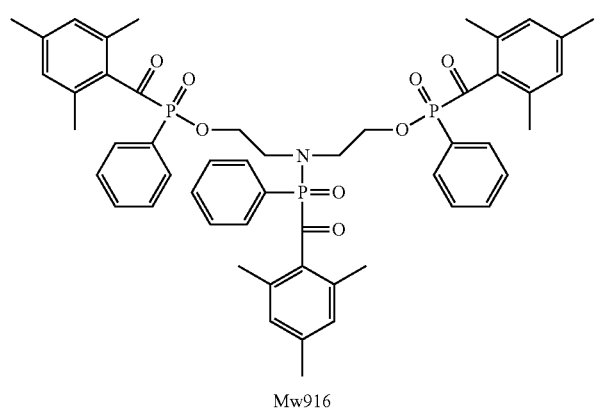
Mw916
P initiator 9
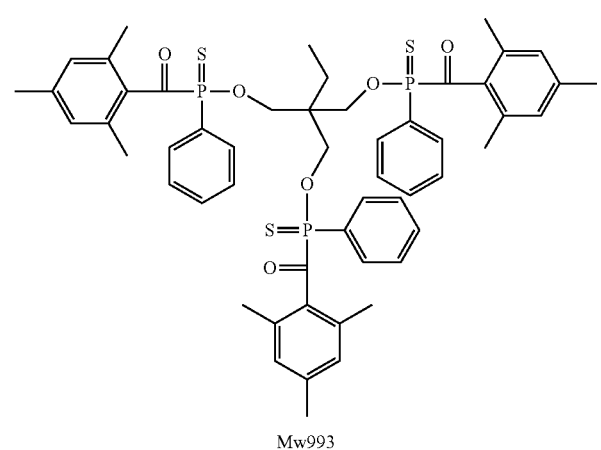
Mw993

P initiator 10
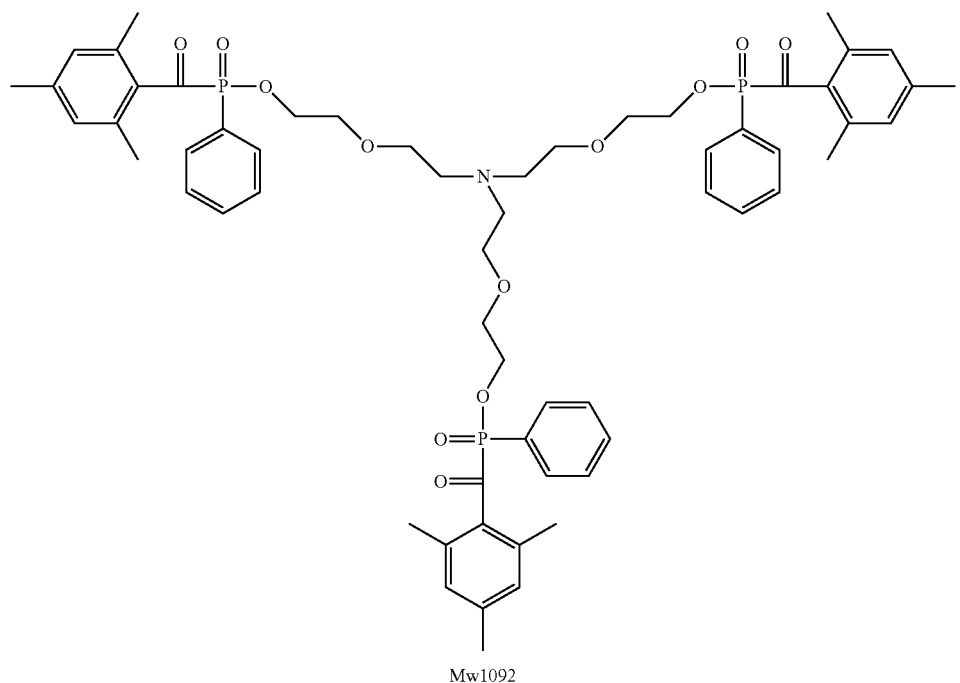
Mw1092
P initiator 11
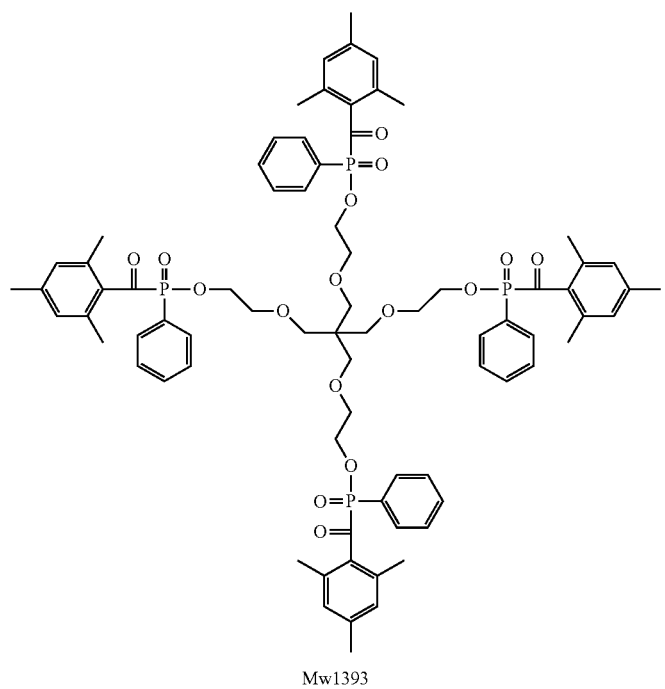
Mw1393

-continued
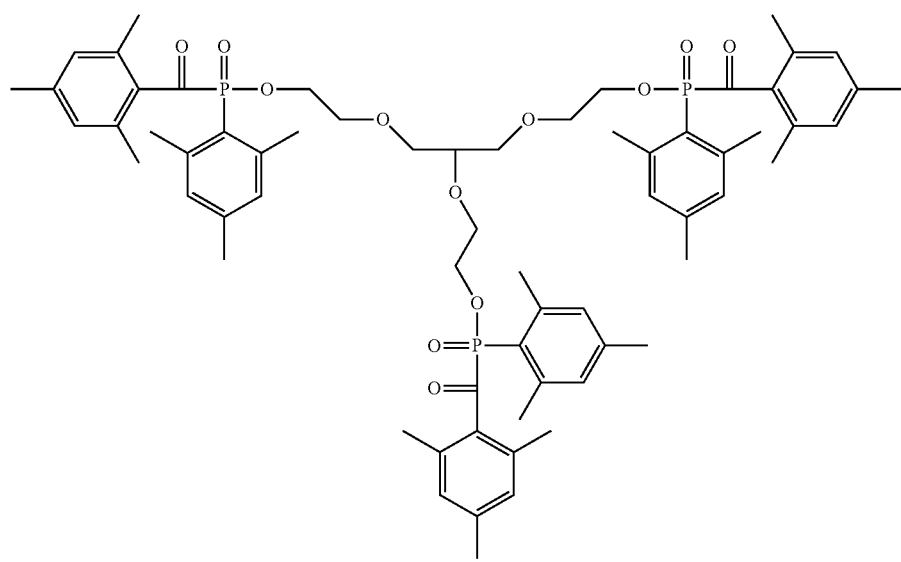
Mw1161
P initiator 12
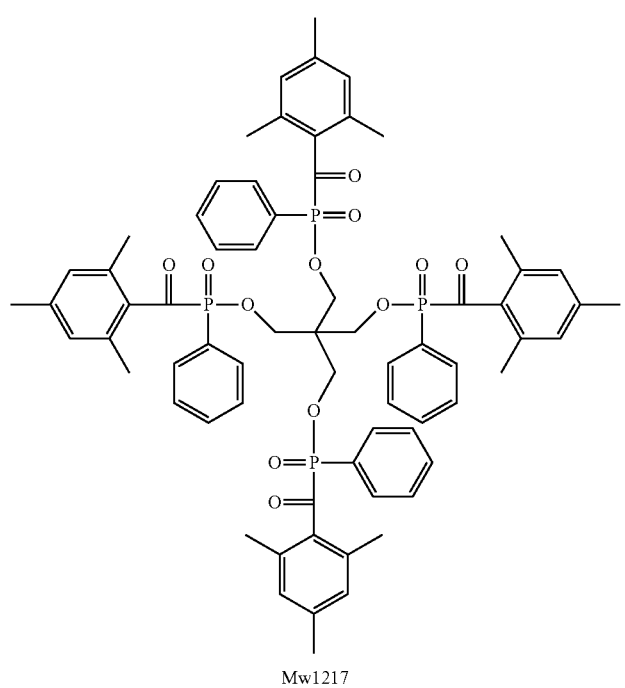
Mw1217
P initiator 13

P initiator 14
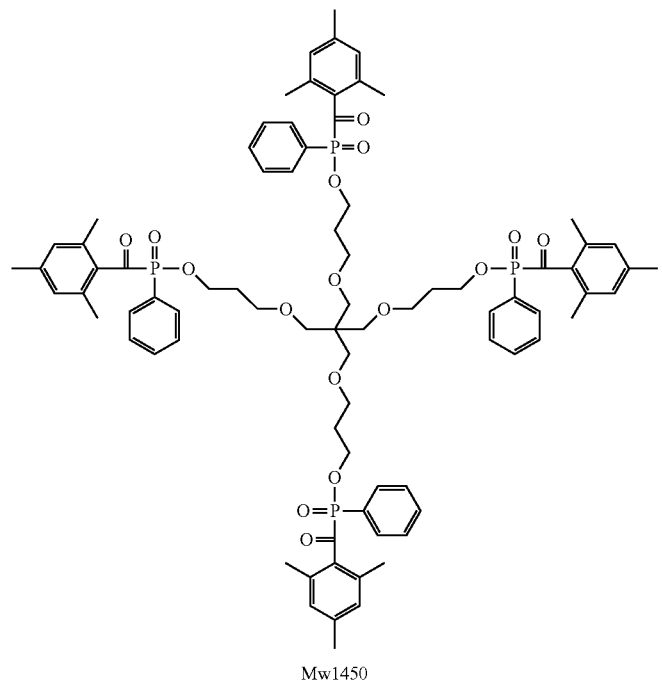
Mw1450
P initiator 15
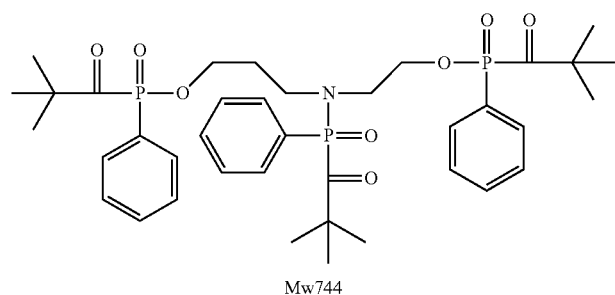
Mw744
P initiator 16
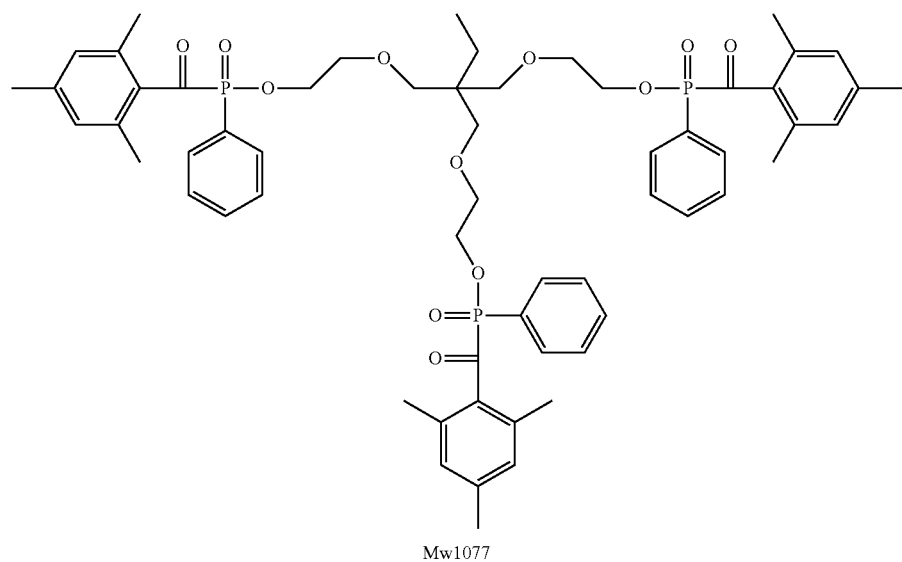
Mw1077

P initiator 17

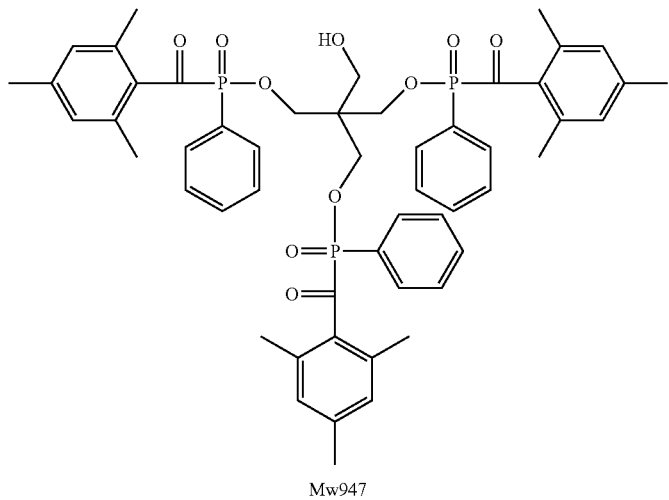

Mw947

The compound (1) (i.e., the compound represented by Formula (1)) can be synthesized using the compound (1-M1) or (1-M2) below as a starting material.

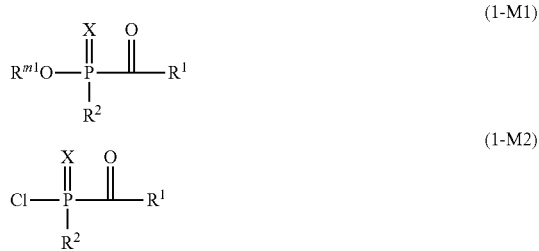

In the compounds (1-M1) and (1-M2), $R^1$, $R^2$, and X have the same meaning as $R^1$, $R^2$, and X in Formula (1). Preferable examples of $R^1$, $R^2$, and X in the compounds (1-M1) and (1-M2) are also the same as those of $R^1$, $R^2$, and X in Formula (1).

In compound (1-M1), $R^{m1}$ represents a hydrogen atom or an alkyl group.

The compound (1-M2) can be synthesized using the compound (1-M1) as a starting material by a common method known in the related art.

Examples of the known method for synthesizing the compound (1-M2) using the compound (1-M1) as a starting material include:
  a method in which the compound (1-M1) is reacted with thionyl chloride (SOC12) in the presence of pyridine; and
  a method in which the compound (1-M1) is reacted with $PCl_5$.

The method for synthesizing the compound (1) using the compound (1-M1) or (1-M2) as a starting material is also known in the related art. Examples of the known synthesis method include:
  a method in which the compound (1-M1) or (1-M2) is reacted with a polyol compound including 3 to 8 hydroxyl groups, a polythiol compound including 3 to 8 thiol groups (—SH), or an amine compound including 1 to 8 amino groups (—$NR_2$; two R's each independently represent a hydrogen atom or an alkyl group having 1 to 3 carbon atoms).

In this method, the types of the polyol, polythiol, and amine compounds can be selected appropriately in accordance with the structure of the compound (1) that is to be synthesized.

Preferable examples of the compound (1) and preferable methods for producing the compound (1) are described, for example, in Paragraphs [0017] to [0053] in JP2017-522364A.

The content of the compound (1) in the ink according to the present disclosure is preferably 0.5% to 25% by mass, is more preferably 1% to 20% by mass, is further preferably 2% to 15% by mass, and is further preferably 4% to 15% by mass of the total amount of the ink in order to further reduce the amount of the residual monomer and/or further enhance the adhesiveness of the image.

The proportion of the compound (1) to the total amount of the photopolymerization initiator included in the ink according to the present disclosure is preferably 50% to 100% by mass, is more preferably 70% to 100% by mass, and is further preferably 80% to 100% by mass.

The content of the photopolymerization initiator in the ink according to the present disclosure is preferably 0.5% to 25% by mass and is more preferably 1% to 20% by mass of the total amount of the ink in order to further reduce the amount of the residual monomer and/or further enhance the adhesiveness of the image.

Other Initiator

The photopolymerization initiator may include an initiator other than the compound (1).

Examples of the other initiator include:
  acetophenone polymerization initiators, such as diethoxyacetophenone, 2-hydroxy-2-methyl-1-phenylpropan-1-one, benzil dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenyl ketone, 2-methyl-2-morpholino(4-thiomethylphenyl)propan-1-one, and 2-benzyl-2-dimethylamino-1-(4-morpholinophenyl)-butanone;
  benzoin polymerization initiators, such as benzoin, benzoin methyl ether, and benzoin isopropyl ether;

acylphosphine oxide polymerization initiators, such as bis(2,4,6-trimethylbenzoyl)phenylphosphine oxide and 2,4,6-trimethylbenzoindiphenylphosphine oxide;

benzil glyoxylate ester; and methylphenyl glyoxylate ester.

The above specific examples are useful as a low-molecular-weight photopolymerization initiator.

Note that the term "low-molecular-weight photopolymerization initiator" used herein refers to a photopolymerization initiator having a molecular weight of less than 500.

A high-molecular-weight photopolymerization initiator is also preferably used as another initiator.

The term "high-molecular-weight photopolymerization initiator" used herein refers to a photopolymerization initiator having a molecular weight of 500 or more.

The molecular weight of the high-molecular-weight photopolymerization initiator is preferably 500 to 3,000, is more preferably 700 to 2,500, and is further preferably 900 to 2,100.

Examples of the high-molecular-weight photopolymerization initiator used as another initiator include the compound represented by Formula (X) below. In Formula (X), n represents an integer of 1 to 30.

The compound represented by Formula (X) is described in, for example, JP2017-105902A (Paragraph [0038], etc.).

late, 3,3',4,4'-tetra(t-butylperoxycarbonyl) benzophenone, and 3,3'-dimethyl-4-methoxybenzophenone; and thioxanthone sensitizers, such as thioxanthone, 2-isopropylthioxanthone, 2-chlorothioxanthone, 2,4-dichloropylthioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(methoxyethoxycarbonyl)thioxanthone, 4-butoxycarbonylthioxanthone, 3-butoxycarbonyl-7-methylthioxanthone, 1-cyclo-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(methoxyethoxy)ethoxycarbonyl] thioxanthone], 1-ethoxycarbonyl-3-(1-methyl-1-morpholinoethyl)thioxanthone], 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, N-allylthioxanthone-3,4-dicarboxyimide, N-octylthioxanthone-3,4-dicarboxyimide, N-(1,1,3,3-tetramethylbutyl)-thioxanthone-3,4-dicarboxyimide, 1-phenoxythioxanthone, 6-ethoxycarbonyl-1-2-methoxythioxanthone, 6-ethoxycarbonyl-2-methyl-thioxanthone,

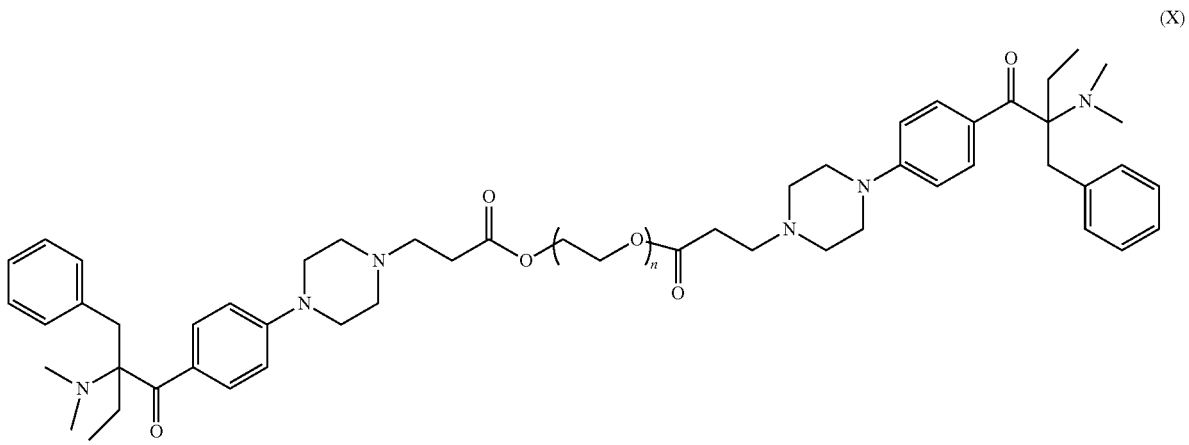

(X)

Commercial initiators may be used as another initiator.

Examples of the commercial initiators include

"Omnirad 819" produced by IGM Resins B.V. (commercial product of bis(2,4,6-trimethylbenzoyl)phenylphosphine oxide), "Omnirad TPO" produced by IGM Resins B.V. (commercial product of 2,4,6-trimethylbenzoyl diphenylphosphine oxide), and "Omnipol 910" produced by IGM Resins B.V. (commercial product of the compound represented by Formula (X)).

Sensitizer

The ink according to the present disclosure preferably includes at least one sensitizer in order to further enhance the quality and adhesiveness of the image and further reduce the amount of the residual monomer.

Examples of the sensitizer include:

benzophenone sensitizers, such as benzophenone, methyl o-benzoylbenzoate-4-phenylbenzophenone, 4,4'-dichlorobenzophenone, hydroxybenzophenone, 4-benzoyl-4'-methyl-diphenyl sulfide, benzophenone acrythioxanthone-2-polyethylene glycol ester, 2-hydroxy-3-(3,4-dimethyl-9-oxo-9H-thioxanthon-2-yloxy)-N,N,N-trim ethyl-1-propanaminium chloride, n-dodecyl-7-methyl-thioxanthone-3-carboxylate, and N,N-diisobutyl-7-methyl-thioxanthone-3-carbandde.

The above specific examples are useful as a low-molecular-weight sensitizer.

The term "low-molecular-weight sensitizer" used herein refers to a sensitizer having a molecular weight of less than 500.

The ink according to the present disclosure may include a high-molecular-weight sensitizer in order to further enhance image quality.

The term "high-molecular-weight sensitizer" used herein refers to a sensitizer having a molecular weight of 500 to 5,000.

The molecular weight of the high-molecular-weight sensitizer is preferably 500 to 3,000, is more preferably 800 to 2,500, and is further preferably 900 to 2,100.

Examples of the high-molecular-weight sensitizer include the compounds represented by Formulae (S1) and (S2) below.

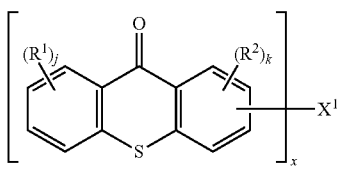

(S1)

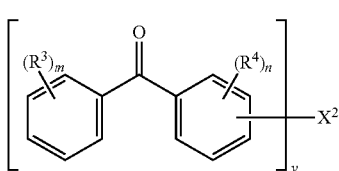

(S2)

In Formulae (S1) and (S2), $R^1$, $R^2$, $R^3$, and $R^4$ each independently represent an alkyl group having 1 to 5 carbon atoms or a halogen atom; x and y each independently represent an integer of 2 to 4; j and m each independently represent an integer of 0 to 4; k and n each independently represent an integer of 0 to 3; when j, k, m, and n are integers of 2 or more, a plurality of $R^1$'s, a plurality of $R^2$'s, a plurality of $R^3$'s, and a plurality of $R^4$'s may be identical to or different from one another; $X^1$ represents a linking group that has a valence of x and includes at least one of a hydrocarbon chain, an ether linkage, or an ester linkage; and $X^2$ represents a linking group that has a valence of y and includes at least one of a hydrocarbon chain, an ether linkage, or an ester linkage.

Preferable examples and specific examples of the compound represented by Formula (S1) are described in Paragraphs [0035] to [0053] in JP2014-162828A.

Commercial compounds may be used as a compound represented by Formula (S1). Specific examples thereof include "Speedcure (registered trademark) 7010" produced by Lambson (1,3-di({α-[1-chloro-9-oxo-9H-thioxanthen-4-yl]oxy}acetylpoly [oxy(1-methylethylene)]oxy)-2,2-bis({α-[1-chloro-9-oxo-9H-thioxanthen-4-yl]oxy}acetylpoly [oxy(1-methylethylene)]oxymethyl)propane, CAS No. 1003567-83-6);

"OMNIPOL (registered trademark) TX" produced by IGM Resins B.V. (polybutyleneglycol bis(9-oxo-9H-thioxanthenyloxy)acetate, CAS No. 813452-37-8); and "Genopo TX-2" produced by Ran A.G.

Preferable examples and specific examples of the compound represented by Formula (S2) are described in Paragraphs [0054] to [0075] in JP2014-162828A.

Commercial compounds may be used as a compound represented by Formula (S2).

Specific examples thereof include "OMNIPOL BP" produced by IGM Resins B.V. (polybutyleneglycol bis(4-benzoylphenoxy)acetate, CAS No. 515136-48-8).

In the case where the ink according to the present disclosure includes the sensitizer, the content of the sensitizer is preferably 0.1% to 15% by mass, is more preferably 0.5% to 10% by mass, and is further preferably 1% to 5% by mass of the total amount of the ink.

Gelling Agent

The ink according to the present disclosure may include a gelling agent.

Examples of the gelling agent that may be included in the ink according to the present disclosure include common gelling agents known in the related art which are described in Paragraphs [0018] to [0032] in WO2015/133605A.

The gelling agent that may be included in the ink according to the present disclosure is preferably at least one selected from the group consisting of an ester compound including a chain alkyl group having 12 or more carbon atoms and a ketone compound including a chain alkyl group having 12 or more carbon atoms.

The ester compound including a chain alkyl group having 12 or more carbon atoms is preferably the ester compound represented by Formula (G1) below.

The ketone compound including a chain alkyl group having 12 or more carbon atoms is preferably the ketone compound represented by Formula (G2) below.

$R^1$—COO—$R^2$   Formula (G1)

$R^3$—CO—$R^4$   Formula (G2)

In Formulae (G1) and (G2), $R^1$ to $R^4$ each independently represent a chain alkyl group having 12 or more carbon atoms.

The alkyl groups represented by $R^1$ to $R^4$ may include a branch portion.

The number of the carbon atoms included in each of the alkyl groups represented by $R^1$ to $R^4$ is preferably 12 to 26.

The melting point of the gelling agent is preferably 40° C. to 90° C., is more preferably 50° C. to 80° C., and is further preferably 60° C. to 80° C.

In the case where the ink according to the present disclosure includes the gelling agent, the content of the gelling agent is preferably 0.1% to 5.0% by mass, is more preferably 0.1% to 4.0% by mass, and is further preferably 0.5% to 2.5% by mass of the total amount of the ink.

Colorant

The ink according to the present disclosure may include at least one colorant.

In the case where the ink according to the present disclosure includes a colorant, the ink can be suitably used as a coloring ink (e.g., a cyan ink, a magenta ink, a yellow ink, a black ink, or a white ink).

The type of the colorant is not limited; common colorants known in the related art, such as a pigment and a dye, may be selected and used appropriately. Among the above colorants, a pigment is more preferably used because it has excellent weather resistance and is rich in color reproducibility.

The type of the pigment is not limited and may be selected appropriately in accordance with the intended application. Examples of the pigment include common organic and inorganic pigments known in the related art.

Examples of the pigment also include resin particles colored with a dye, a commercial pigment dispersion, and a surface-treated pigment (e.g., a pigment dispersion prepared by dispersing a pigment in a dispersion medium (e.g., a radical photopolymerizable monomer or an organic solvent); and a surface-treated pigment prepared by treating the surface of a pigment with a resin, a pigment derivative, or the like).

Examples of the organic and inorganic pigments include a yellow pigment, a red pigment, a magenta pigment, a blue pigment, a cyan pigment, a green pigment, an orange pigment, a purple pigment, a brown pigment, a black pigment, and a white pigment.

In the case where the ink according to the present disclosure includes a pigment as a colorant, the ink according to the present disclosure may further include a pigment dispersing agent.

For pigments and pigment dispersing agents, documents known in the related art, such as Paragraphs [0060] to [0074]

in WO2015/133605A, Paragraphs [0152] to [0158] in JP2011-225848A, and Paragraphs [0132] to [0149] in JP2009-209352A, may be referred as needed.

In the case where the ink according to the present disclosure includes the colorant, the content of the colorant is preferably 1% to 20% by mass and is more preferably 2% to 10% by mass of the total amount of the ink.

Surfactant

The content of a surfactant in the ink according to the present disclosure is preferably 0.01% by mass or less of the total amount of the ink. The ink according to the present disclosure does not necessarily include a surfactant. In other words, the content of the surfactant may be 0% by mass.

When the content of the surfactant in the ink according to the present disclosure is 0.01% by mass or less, the following advantages are gained.

Specifically, in the case where an ink film is formed on a recording medium using, for example, the ink according to the present disclosure as an ink of the first color, the ink film is irradiated with an active energy ray, and at least one subsequent ink is applied onto the ink film to record a secondary or higher color image (e.g., a secondary color image), the quality of the secondary or higher color image can be enhanced.

This is presumably because limiting the content of the surfactant to 0.01% by mass or less reduces the likelihood of the surfactant bleeding on the surface of the ink film when the ink film is irradiated with an active energy ray. The reduction in the likelihood of the surfactant bleeding on the surface of the ink film results in a reduction in the likelihood of the subsequent ink applied onto the ink film being repelled by the ink film and consequently enables a high-quality secondary or higher color image to be formed.

In the above case, "subsequent ink" may be either an active energy ray-curable ink that corresponds to the ink according to the present disclosure or an active energy ray-curable ink that does not correspond to the ink according to the present disclosure.

The content of the surfactant in the ink according to the present disclosure is preferably 0.0001% by mass or less of the total amount of the ink in order to further enhance the quality of the secondary or higher color image.

Organic Solvent

The ink according to the present disclosure may contain a trace amount of organic solvent such that the above-described advantageous effects are not impaired.

However, it is preferable that the ink according to the present disclosure do not include an organic solvent or, when the ink includes an organic solvent, the content of the organic solvent be reduced in order to further reduce the impact on recording media.

In order to further reduce the impact on recording media, the content of the organic solvent in the ink is preferably less than 5% by mass, is more preferably less than 3% by mass, and is further preferably less than 1% by mass of the total amount of the ink.

Water

The ink according to the present disclosure may include a trace amount of water such that the above-described advantageous effects are not impaired.

However, it is preferable that the ink according to the present disclosure do not include water or, when the ink includes water, the content of water be reduced in order to achieve the above-described advantageous effects more effectively.

The content of water in the ink is preferably less than 5% by mass, is more preferably less than 3% by mass, and is further preferably less than 1% by mass of the total amount of the ink.

Other Constituents

The ink according to the present disclosure may include constituents other than the above-described constituents.

Examples of the other constituents include a polymerization inhibitor, a sensitizer assistant, a matting agent, an ultraviolet absorber, an infrared absorber, an antimicrobial agent, a basic compound (e.g., a basic alkali-metal compound, a basic alkaline-earth metal compound, or a basic organic compound (e.g., an amine)), and a resin (e.g., a polyester resin, a polyurethane resin, a vinyl resin, an acrylic resin, or a rubber resin).

Ink Jet Ink

The ink according to the present disclosure is preferably an ink jet ink.

In the case where the ink according to the present disclosure is used as an ink jet ink, the preferable physical properties of the ink are as described below.

The surface tension of the ink according to the present disclosure (i.e., the surface tension at 25° C.) is preferably 20 to 50 mN/m and is more preferably 28 to 50 mN/m.

When the surface tension of the ink is 20 mN/m or more, ink discharge performance is further enhanced.

When the surface tension of the ink is 50 mN/m or less, image quality is further enhanced.

The viscosity of the ink according to the present disclosure at 25° C. is preferably 10 to 50 mPas, is more preferably 10 to 30 mPas. and is further preferably 10 to 25 mPas. The viscosity of the ink can be adjusted by, for example, changing the compositional ratio of the constituents of the ink.

The term "viscosity" used herein refers to a viscosity measured with a viscometer. Examples of the viscometer include "VISCOMETER RE-85L" produced by Toki Sangyo Co., Ltd.

When the viscosity of the ink falls within the above preferable range, discharge stability can be further enhanced.

Image Recording Method

An image recording method according to the present disclosure includes a step of applying the ink according to the present disclosure onto a recording medium to form an ink film (hereinafter, also referred to as "first application step"), and a step of irradiating the ink film with an active energy ray (hereinafter, also referred to as "first irradiation step").

The image recording method according to the present disclosure may further include other steps as needed.

As described above, in the image recording method according to the present disclosure, the ink according to the present disclosure is used. Therefore, the image recording method according to the present disclosure produces the same advantageous effects as the ink according to the present disclosure.

Recording Medium

A recording medium used in the image recording method according to the present disclosure is not limited.

Examples of the recording medium include a paper sheet; a paper sheet laminated with a plastic (e.g., polyethylene, polypropylene, or polystyrene); a metal sheet (e.g., a sheet made of a metal such as aluminum, zinc, or copper); a plastic film (e.g., a film made of a plastic such as a polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, or an acrylic resin); a paper sheet on which a film made of any of the above metals is formed by lamination or vapor deposition; and a plastic film on which a film made of any of the above metals is formed by lamination or vapor deposition.

First Application Step

In the first application step, the ink according to the present disclosure is applied onto the recording medium to form an ink film.

Examples of the method for application of the ink include common application methods known in the related art, such as a coating method, an ink jet method, and a dipping method.

An ink jet method is preferable as a method for application of the ink. In other words, the ink according to the present disclosure is preferably an ink jet ink.

An ink jet method is advantageous in that it does not require a printing plate and is capable of ejecting required amounts of ink droplets to intended positions on the basis of only a digital image.

For applying the ink to a recording medium by an ink jet method, a common application method known in the related art in which the ink is discharged from nozzles (i.e., discharge holes) of an ink jet head and applied onto a recording medium is applicable and can be performed with an ink jet recording apparatus.

The type of the ink jet recording apparatus is not limited. A common ink jet recording apparatus known in the related art which is capable of achieving the intended resolution may be selected and used appropriately. That is, common ink jet recording apparatuses known in the related art, which include commercial ink jet recording apparatuses, may be used.

Examples of the ink jet recording apparatus include an ink jet recording apparatus that includes an ink feed system, a temperature sensor, and a heating unit.

The ink feed system is constituted by, for example, a source tank that accommodates an ink, a feed pipe, an ink feed tank disposed immediately before an ink jet head, a filter, and a piezoelectric ink jet head. The piezoelectric ink jet head can be driven to discharge multi-size dots preferably having a volume of 1 to 100 pL and more preferably having a volume of 1 to 60 pL preferably at a resolution of 320 dpi (dots per inch)×320 dpi to 4,000 dpi×4,000 dpi (dots per inch), more preferably at 400 dpi×400 dpi to 1,600 dpi×1,600 dpi, and further preferably at 720 dpi×720 dpi to 1,600 dpi×1,600 dpi.

Note that "dpi" refers to the number of dots per inch (2.54 cm).

The volume of one droplet discharged from each of the nozzles of the ink jet head varies depending on the intended image resolution and is preferably 0.5 to 10 pL and more preferably 0.5 to 2.5 pL in order to form a high-definition image.

The ink application system used in the ink jet method may be either a single pass system or a scan system and is preferably a single pass system in consideration of the speed at which an image is recorded.

Note that a single pass system is a system in which a line head including nozzles arranged to cover the entirety of a side of a recording medium is used as an ink jet head and fixed in position and, while the recording medium is transported in a direction perpendicular to the direction in which the nozzles of the line head are arranged, an ink is applied onto the recording medium.

A scan system is a system in which a short serial head is used as an ink jet head and an ink is applied onto a recording medium while the short serial head is scanned across the recording medium.

The speed at which the recording medium is transported is preferably 1 to 120 m/s and is more preferably 50 m/s to 120 m/min.

Note that the preferable range of the speed at which a recording medium is transported in the second or later step is the same as the preferable range of the speed at which a recording medium is transported in the first step.

In the image recording method according to the present disclosure, the speed at which a recording medium is transported may be constant throughout all the steps or may be changed in at least some of the steps.

First Irradiation Step

In the first irradiation step, the ink film formed in the first application step is irradiated with an active energy ray.

In the first irradiation step, the irradiation of the ink film with an active energy ray causes at least a part of the photopolymerizable monomers included in the ink film to polymerize and thereby forms an image.

In the case where only a part of the photopolymerizable monomers included in the ink film is polymerized in the first irradiation step, the amount of irradiation energy of the active energy ray is reduced compared with the case where substantially the entirety of the photopolymerizable monomers included in the ink film is polymerized.

In the present disclosure, polymerizing only a part of the photopolymerizable monomers included in the ink film is also referred to as "partial curing", and irradiating the ink film with an active energy ray to perform partial curing is also referred to as "pinning exposure".

In the present disclosure, polymerizing substantially the entirety of the photopolymerizable monomers included in the ink film is also referred to as "full curing", and irradiating the ink film with an active energy ray to perform full curing is also referred to as "full exposure".

The first irradiation step may be
  a step of performing pinning exposure (i.e., partial curing) of the ink film,
  a step of performing full exposure (i.e., full curing) of the ink film, or
  a step of performing pinning exposure of the ink film and subsequently performing full exposure of the ink film.

Since the ink according to the present disclosure includes the specific initiator (compound (1)) and at least one of the monomer A or the monomer B, the ink film has excellent curability from the surface to the inside during not only full exposure but also pinning exposure. Therefore, in the first irradiation step, the partial curing and/or full curing can be effectively performed by the pinning exposure and/or full exposure.

In the case where the first irradiation step is a step of performing pinning exposure (i.e., partial curing) of the ink film, an image that is a partially cured ink film is formed in the first irradiation step.

In the case where the first irradiation step is a step of performing full exposure (i.e., full curing) of the ink film or a step of performing pinning exposure and full exposure of the ink film in this order, an image that is a fully cured ink film is formed in the first irradiation step.

In the case where the first irradiation step is a step of performing pinning exposure (i.e., partial curing), the image recording method preferably includes the second application step and second irradiation step described below.

The reaction rate of the ink film subsequent to the pinning exposure (i.e., partial curing) is preferably 10% to 80%.

Note that the term "reaction rate" of the ink film used herein refers to the rate of polymerization of the photopolymerizable monomers included in the ink film which is determined by high-performance liquid chromatography.

When the reaction rate of the ink film is 10% or more, the possibility of dots of the ink that is to be applied onto the ink film (e.g., the second ink described below) failing to spread to a sufficient degree is reduced and, consequently, the quality of the final image (e.g., the secondary or higher color image described below) is enhanced.

When the reaction rate of the ink film is 80% or less, the possibility of dots of the ink that is to be applied onto the ink film (e.g., the second ink described below) spreading to an excessive degree is reduced and the droplet interference between the ink dots is reduced. This enhances the quality of the final image.

The reaction rate of the ink film is preferably 15% or more in order to further enhance the quality of the final image.

The reaction rate of the ink film is preferably 75% or less, is more preferably 50% or less, is preferably 40% or less, is more preferably 30% or less, and is further preferably 25% or less in order to further enhance the quality of the final image.

The reaction rate of the ink film subsequent to the full exposure (i.e., full curing) is preferably more than 80% and 100% or less, is more preferably 85% to 100%, and is further preferably 90% to 100%.

When the above reaction rate is more than 80%, the adhesiveness of the image is further enhanced.

The reaction rate of the ink film is determined by the following method.

A recording medium having an ink film formed thereon and irradiated with an active energy ray is prepared. A sample piece having a size of 20 m×50 mm is taken from a region of the recording medium in which the ink film is present (hereinafter, referred to as "irradiated sample piece"). The irradiated sample piece is immersed in 10 mL of tetrahydrofuran (THF) for 24 hours in order to prepare a solution containing an eluted ink. This solution is subjected to high-performance liquid chromatography in order to measure the amount of photopolymerizable monomers (hereinafter, referred to as "amount of monomers X1 after irradiation").

Subsequently, the same operation as described above is performed, except that the ink film formed on a recording medium is not irradiated with an active energy ray and the amount of photopolymerizable monomers is measured (hereinafter, referred to as "amount of monomers X1 before irradiation").

The ink reaction rate (%) is calculated using the following equation on the basis of the amount of monomers X1 after irradiation and the amount of monomers X1 before irradiation.

Ink reaction rate (%)=((amount of monomers X1 before irradiation−amount of monomers X1 after irradiation)/amount of monomers X1 before irradiation)×100

The active energy ray used in the irradiation step (i.e., the active energy ray used for pinning exposure and/or full exposure; the same applies hereinafter) is preferably ultraviolet light (i.e., UV light) and is more preferably UV light having a maximum illuminance at a wavelength of 385 to 410 nm.

A common UV light source known in the related art in which at least one of illuminance or irradiation time is variable can be used as a UV light source (i.e., a source of UV light).

The UV light source is preferably a light-emitting diode (LED) light source.

The irradiation step preferably includes a substep of irradiating the ink film with an active energy ray in an atmosphere having an oxygen concentration of 5% by volume or less. In such a case, the possibility of the polymerization reaction being inhibited by oxygen is further reduced and, consequently, the curability of the inside of the ink film is further enhanced. This enables the formation of an image having higher adhesiveness to recording media.

The irradiation step may include
a substep of irradiating the ink film with an active energy ray in an atmosphere having an oxygen concentration of more than 5% by volume, and
a substep of irradiating the ink film with an active energy ray in an atmosphere having an oxygen concentration of 5% by volume or less.

The atmosphere having an oxygen concentration of 5% by volume or less is preferably an atmosphere containing an inert gas (e.g., a nitrogen gas, an argon gas, or a helium gas).

The atmosphere having an oxygen concentration of 5% by volume or less is particularly preferably an atmosphere having an oxygen concentration of 1% by volume or less.

The illuminance of the active energy ray used for the pinning exposure is preferably 0.10 to 0.50 W/cm, is more preferably 0.20 to 0.50 W/cm, and is further preferably 0.25 to 0.45 W/cm in order to more easily achieve the above-described ink reaction rate.

The amount of irradiation energy of the active energy ray used for the pinning exposure (hereinafter, also referred to as "amount of exposure") is preferably 2 to 20 $mJ/cm^2$ and is more preferably 4 to 15 $mJ/cm^2$ in order to more easily achieve the above-described ink reaction rate.

The illuminance of the active energy ray used for the full exposure is preferably 1.0 W/cm or more, is more preferably 2.0 W/cm or more, and is further preferably 4.0 W/cm or more in order to further enhance the adhesiveness of the image to a recording medium.

The upper limit for the illuminance of the active energy ray used for the full exposure is not set and may be, for example, 10 W/cm.

The amount of irradiation energy of the active energy ray used for the full exposure (i.e., "amount of exposure") is preferably 20 $mJ/cm^2$ or more and is more preferably 80 $mJ/cm^2$ or more in order to further enhance the adhesiveness of the image to a recording medium.

The upper limit for the amount of irradiation energy of the active energy ray used for the full exposure is not set and may be, for example, 240 $mJ/cm^2$.

Second Application Step

The image recording method according to the present disclosure may include a second application step of applying a second ink onto the ink film that has been irradiated with an active energy ray in the first irradiation step (hereinafter, also referred to as "first ink film") to form a second ink film in contact with the first ink film.

The second ink is preferably an active energy ray-curable ink that includes a photopolymerizable monomer, a photopolymerization initiator, and a colorant and is more preferably the ink according to the present disclosure.

The number of the types of the second inks used in the second application step may be only one or two or more.

It is preferable that the ink according to the present disclosure used in the first application step (hereinafter, also referred to as "first ink") and the second ink have different hues.

In the case where the first and second inks have different hues, a secondary or higher color image (e.g., a secondary color image) can be recorded.

In the second application step, the second ink may be applied onto both of the first ink film and a region in which the first ink film is absent.

In the second application step, it is sufficient that the second ink be applied onto at least a part of the first ink film; the second ink is not necessarily applied onto the entirety of the first ink film.

The method for the application of the second ink is the same as the method for the application of the first ink. Preferable examples are also the same.

Second Irradiation Step

An image recording method according to an aspect of the present disclosure which includes the second application step may further include a second irradiation step of irradiating the entirety of the first and second ink films with a second active energy ray.

The second irradiation step may be
a step of performing pinning exposure (i.e., partial curing) of the entirety of the first and second ink films,
a step of performing full exposure (i.e., full curing) of the entirety of the first and second ink films, or
a step of performing pinning exposure and full exposure of the entirety of the first and second ink films in this order.

Preferable second active energy rays and preferable conditions for irradiation with the second active energy ray are the same as preferable active energy rays used in the first irradiation step and preferable conditions for irradiation with the active energy ray.

For example, preferable irradiation conditions under which pinning exposure and full exposure are performed in the second irradiation step are the same as preferable irradiation conditions under which pinning exposure and full exposure are performed in the first irradiation step.

EXAMPLES

Examples of the present disclosure are described below. Note that the present disclosure is not limited by Examples below.

Hereinafter, "parts" and "%" are on a mass basis unless otherwise specified. Synthesis of Specific Initiators (i.e., Compounds (1))

P initiators 1, 2, 3, 4, 7, 8, 11, 12, 13, 16, and 17, which are specific examples of the specific initiator (i.e., compound (1), that is, the compound represented by Formula (1)), were synthesized in accordance with Examples 5, 2, 3, 1, 6, 9, 4, 11, 7, 10, and 8 in JP2017-522364A, respectively.
Preparation of Pigment Dispersion A magenta mill base M was prepared as a pigment dispersion used for preparing inks.

Specifically, the constituents of the magenta mill base M were charged into a disperser "Motor Mill M50" produced by Eiger and dispersed using zirconia beads having a diameter of 0.65 mm at a rotation speed of 9 m/s for 8 hours to prepare a pigment dispersion.
Composition of Magenta Mill Base M Magenta (M) pigment: "CINQUASIA MAGENTA RT-355D" produced by BASF SE Japan: 30 parts by mass "SR9003" produced by Sartomer (propyleneoxy-modified neopentyl glycol diacrylate (PONPGDA), number of propyleneoxy groups: 2, molecular weight: 328, monomer B): 50 parts by mass "SOLSPERSE 32000" produced by Lubrizol (pigment dispersing agent): 20 parts by mass
Preparation of Magenta (M) Inks Magenta inks (hereinafter, also referred to as "M inks") having the compositions described in Tables 1 to 5 were prepared by mixing the constituents as described in Tables 1 to 5 with one another in order to prepare inks of Examples and Comparative Examples.

Note that, in Example 12 and Comparative Example 2, the content of the monomer B in the M ink was changed to 0% by mass by replacing SR9003 included in the magenta mill base M with the same mass of dimethylacrylamide (DMAA).
Preparation of Image Recording Apparatus An image recording apparatus (specifically, an ink jet recording apparatus) was prepared that included
a transport system that transports a recording medium; and
a head for black ink, an ultraviolet (UV) light source, a head for cyan ink, an UV light source, a head for magenta ink, an UV light source, a head for yellow ink, an UV light source, a head for white ink, and a nitrogen purge UV exposure machine that were arranged in order from the upstream side in the direction in which a recording medium is transported.

The transport system was a single-pass transport system of a sheet-fed printing press. The order in which the above heads were arranged was changeable in accordance with the order in which ink droplets were to be ejected.

The heads for black, cyan, magenta, and yellow inks were piezoelectric ink jet heads (specifically, line heads) including ink jet nozzles (hereinafter, also referred to simply as "nozzles"). Each of the nozzles was capable of ejecting multi-size dots having a volume of 1 to 60 pL at a resolution of 1,200 dpi×1,200 dpi. Note that "dpi" refers to the number of dots per inch (2.54 cm).

The ink feed system of the ink jet recording apparatus was constituted by source tanks, feed pipes, ink feed tanks disposed immediately before the ink jet heads, filters, and the ink jet heads. In the image recording performed in Examples, the portions of the ink feed system from the ink feed tanks to the ink jet heads were thermally insulated and heated. Furthermore, a temperature sensor was disposed in the vicinity of each of the ink feed tanks and the nozzles of the ink jet heads and temperature control was performed such that the temperatures of the nozzle portions were always 70° C.±2° C. Note that, in the example where an ink including a gelling agent was used (Example 30), temperature control was performed such that the temperatures of the nozzle portions were always 90° C.±2° C.

One of the M inks prepared for Examples and the M inks prepared for Comparative Examples was charged into the source tank connected to the head for magenta ink.

The UV light sources disposed immediately after the ink jet heads and the UV light source included in the nitrogen purge UV exposure machine were light-emitting diode (LED) lamps produced by KYOCERA Corporation (width: 4 cm, G4B, maximum illuminance: 10 W) capable of emitting UV light having a maximum illuminance at wavelengths of 385 to 410 nm.

The illuminance of UV light emitted from these UV light sources and the time for irradiation with the UV light emitted from the UV light sources were changeable.

In the image recording performed in Examples, the speed at which a recording medium was transported was adjusted such that the irradiation of ink droplets discharged from the heads onto the recording medium with UV light was started 0.1 seconds after the ink droplets landed on the recording medium.

Examples 1 to 43 and Comparative Examples 1 to 5

Images were recorded using the magenta inks (M inks), the image recording apparatus, and a recording medium "OK Top Coat Paper" (84.9 g/m$^2$) produced by Oji Paper Co., Ltd. in accordance with the above image recording method and were evaluated in terms of the following items.

Image Evaluations

Each M ink was applied onto the recording medium in a halftone pattern at a dot percent of 70% using the above image recording apparatus. The M ink deposited on the recording medium was irradiated with UV light having an illuminance of 0.40 W/cm$^2$ for 0.024 seconds (pinning exposure) and subsequently irradiated with UV light having an illuminance of 5.0 W/cm$^2$ for 0.024 seconds (full exposure) to form an image (specifically, a magenta halftone image).

In this evaluation, pinning exposure was performed using a UV light source disposed immediately after the head for magenta ink in an air atmosphere having an oxygen concentration of 20%.

Full exposure was performed using a nitrogen purge UV exposure machine in an atmosphere having an oxygen concentration of 1% and a nitrogen concentration of 99%.

Evaluation of Image Quality

The image was visually inspected and the quality of the image was evaluated in accordance with the following evaluation criteria.

Tables 1 to 5 list the results.

In the following evaluation criteria, an image having the highest quality (i.e., the lowest graininess) is rated as "5".

Criteria for Evaluating Image Quality

5: The image had no graininess and was homogeneous as a whole.

4: The image slightly had minute graininess, but was substantially homogeneous as a whole.

3: The image had minute graininess, but was acceptable for practical use.

2: The image had considerable graininess that was visually conspicuous, and was unacceptable for practical use.

1: The image had considerable graininess that formed strong inconsistencies in density, and was far from homogeneous.

Evaluation of Residual Monomer

A 10 m×10 mm square sample for residual monomer evaluation was taken from a region of the recording medium with the image in which the image was recorded.

The sample for residual monomer evaluation was immersed in 1 mL of tetrahydrofuran (THF) for 24 hours and then removed from THF.

The total amount of the monomers eluted in THF was measured by high-performance liquid chromatography.

The amount of residual monomer (ppm by mass) was calculated as a ratio A/B (ppm by mass) of the total amount A of the monomers eluted in THF to the total amount B of the monomers included in the M ink used for recording the image on the sample for residual monomer evaluation.

On the basis of the calculated amount of the residual monomer (ppm by mass), the residual monomer in the image was evaluated in accordance with the following evaluation criteria.

Tables 1 to 5 list the results.

In the following evaluation criteria, an image in which the amount of the residual monomer was the smallest is rated as "5".

Criteria for Evaluating Residual Monomer

5: The amount of residual monomer was less than 10 ppm by mass.

4: The amount of residual monomer was 10 ppm by mass or more and less than 30 ppm by mass.

3: The amount of residual monomer was 30 ppm by mass or more and less than 40 ppm by mass.

2: The amount of residual monomer was 40 ppm by mass or more and less than 50 ppm by mass.

1: The amount of residual monomer was 50 ppm by mass or more.

Evaluation of Adhesiveness

A piece of Sellotape (registered trademark) having a width of 1 cm was put onto the image. The peel force between the recording medium and the image (i.e., the force (N/cm) required for peeling the image from the recording medium) was measured using a standard model digital force gauge "ZTS series", a vertical motorized test stand "MX2 series", and a 90-degree peel test fixture "P90-200N/200N-EZ film grip FC series" produced by IMADA Co., Ltd. at a peeling speed of 300 mm/min. On the basis of the results, the adhesiveness of the image was evaluated in accordance with the following evaluation criteria.

Tables 1 to 5 list the results.

In the following evaluation criteria, an image having the highest adhesiveness is rated as "5".

Criteria for Evaluating Adhesiveness

5: The peeling force was 0.5 N or more.

4: The peeling force was 0.3 N/cm or more and less than 0.5 N/cm.

3: The peeling force was 0.2 N/cm or more and less than 0.3 N/cm.

2: The peeling force was 0.1 N/cm or more and less than 0.2 N/cm.

1: The peeling force was less than 0.1 N/cm.

TABLE 1

| Constituent | Type | Number of functional groups | Mw | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|
| Monomer A | EOTMPTA | 3 | 428 | 32.5 | 32.5 | 32.5 | 32.5 | 32.5 | 32.5 | 32.5 | 32.5 | 32.5 | 32.5 |
| | POTMPTA | 3 | 470 | | | | | | | | | | |
| | POGLTA | 3 | 480 | | | | | | | | | | |
| | PEGDA | 2 | 522 | | | | | | | | | | |
| | DPHA | 6 | 578 | | | | | | | | | | |

TABLE 1-continued

| Constituent | Type | Number of functional groups | Mw | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|
| Monomer B | NA | 1 | 198 | 40 | | | | | | | | | |
| | LA | 1 | 240 | | 40 | | | | | | | | |
| | THFA | 1 | 156 | | | 40 | | | | | | | |
| | NVC | 1 | 139 | | | | 40 | | | | | | |
| | CTFA | 1 | 200 | | | | | 40 | | | | | |
| | PEA | 1 | 192 | | | | | | 40 | | | | |
| | STA | 1 | 325 | | | | | | | 40 | | | |
| | TEGDVE | 2 | 202 | | | | | | | | 40 | | |
| | MPDDA | 2 | 226 | | | | | | | | | 40 | |
| | PONPGDA | 2 | 328 | | | | | | | | | | 40 |
| | TPGDA | 2 | 300 | | | | | | | | | | |
| Other monomer | DMAA | 1 | 119 | | | | | | | | | | |
| Specific initiator (compound (1)) | P initiator 2 | | 1035 | 10 | 10 | 10 | 10 | 10 | 10 | 10 | 10 | 10 | 10 |
| | P initiator 1 | | 944 | | | | | | | | | | |
| | P initiator 3 | | 2068 | | | | | | | | | | |
| | P initiator 4 | | 1569 | | | | | | | | | | |
| | P initiator 7 | | 984 | | | | | | | | | | |
| | P initiator 8 | | 916 | | | | | | | | | | |
| | P initiator 11 | | 1393 | | | | | | | | | | |
| | P initiator 12 | | 1161 | | | | | | | | | | |
| | P initiator 13 | | 1217 | | | | | | | | | | |
| | P initiator 16 | | 1077 | | | | | | | | | | |
| | P initiator 17 | | 947 | | | | | | | | | | |
| Other initiator | Omnipol910 | | 910 | | | | | | | | | | |
| | TPO | | 348 | | | | | | | | | | |
| Sensitizer | Speedcure 7010 | | | 2 | 2 | 2 | 2 | 2 | 2 | 2 | 2 | 2 | 2 |
| | ITX | | | | | | | | | | | | |
| Polymerization inhibitor | UV22 | | | 0.5 | 0.5 | 0.5 | 0.5 | 0.5 | 0.5 | 0.5 | 0.5 | 0.5 | 0.5 |
| Gelling agent | UNISTER M-2222SL | | | | | | | | | | | | |
| | KAO WAX T1 | | | | | | | | | | | | |
| Pigment dispersion | Magenta mill base M | | | 15 | 15 | 15 | 15 | 15 | 15 | 15 | 15 | 15 | 15 |
| | Monomer A (mass %) | | | 32.5 | 32.5 | 32.5 | 32.5 | 32.5 | 32.5 | 32.5 | 32.5 | 32.5 | 32.5 |
| | Monomer B (mass %) | | | 47.5 | 47.5 | 47.5 | 47.5 | 47.5 | 47.5 | 47.5 | 47.5 | 47.5 | 47.5 |
| | Monomer A + Monomer B (mass %) | | | 80.0 | 80.0 | 80.0 | 80.0 | 80.0 | 80.0 | 80.0 | 80.0 | 80.0 | 80.0 |
| | Compound (1) (mass %) | | | 10 | 10 | 10 | 10 | 10 | 10 | 10 | 10 | 10 | 10 |
| | Mass ratio [A/(A + B)] | | | 0.41 | 0.41 | 0.41 | 0.41 | 0.41 | 0.41 | 0.41 | 0.41 | 0.41 | 0.41 |
| | Mass ratio [(A + B)/(1)] | | | 8 | 8 | 8 | 8 | 8 | 8 | 8 | 8 | 8 | 8 |
| Evaluation results | Image quality | | | 5 | 5 | 5 | 5 | 5 | 5 | 5 | 5 | 5 | 5 |
| | Residual monomer | | | 3 | 3 | 3 | 4 | 4 | 4 | 4 | 4 | 5 | 5 |
| | Adhesiveness | | | 4 | 4 | 4 | 4 | 4 | 4 | 5 | 5 | 5 | 5 |

TABLE 2

| Constituent | Type | Number of functional groups | Mw | Example 11 | Example 12 | Example 13 | Example 14 | Example 15 | Example 16 | Example 17 | Example 18 | Example 19 | Example 20 |
|---|---|---|---|---|---|---|---|---|---|---|---|---|---|
| Monomer A | EOTMPTA | 3 | 428 | 32.5 | 72.5 | 52.5 | 22.5 | 12.5 | | 32.5 | 32.5 | | |
| | POTMPTA | 3 | 470 | | | | | | | | | 32.5 | |
| | POGLTA | 3 | 480 | | | | | | | | | | 32.5 |
| | PEGDA | 2 | 522 | | | | | | | | | | |
| | DPHA | 6 | 578 | | | | | | | | | | |
| Monomer B | NA | 1 | 198 | | | | | | | | | | |
| | LA | 1 | 240 | | | | | | | | | | |
| | THFA | 1 | 156 | | | | | | | | | | |
| | NVC | 1 | 139 | | | | | | | 20 | | | |
| | CTFA | 1 | 200 | | | | | | | | | | |
| | PEA | 1 | 192 | | | | | | | | | | |
| | STA | 1 | 325 | | | | | | | | | | |
| | TEGDVE | 2 | 202 | | | | | | | | | | |
| | MPDDA | 2 | 226 | | | | | | | | | | |
| | PONPGDA | 2 | 328 | | | 20 | 50 | 60 | 72.5 | 20 | 20 | 20 | 20 |
| | TPGDA | 2 | 300 | 40 | | | | | | | 20 | 20 | 20 |
| Other monomer | DMAA | 1 | 119 | | | | | | | | | | |

TABLE 2-continued

| Constituent | Type | Number of functional groups | Mw | Example 11 | Example 12 | Example 13 | Example 14 | Example 15 | Example 16 | Example 17 | Example 18 | Example 19 | Example 20 |
|---|---|---|---|---|---|---|---|---|---|---|---|---|---|
| Specific initiator (compound (1)) | P initiator 2 | | 1035 | 10 | 10 | 10 | 10 | 10 | 10 | 10 | 10 | 10 | 10 |
| | P initiator 1 | | 944 | | | | | | | | | | |
| | P initiator 3 | | 2068 | | | | | | | | | | |
| | P initiator 4 | | 1569 | | | | | | | | | | |
| | P initiator 7 | | 984 | | | | | | | | | | |
| | P initiator 8 | | 916 | | | | | | | | | | |
| | P initiator 11 | | 1393 | | | | | | | | | | |
| | P initiator 12 | | 1161 | | | | | | | | | | |
| | P initiator 13 | | 1217 | | | | | | | | | | |
| | P initiator 16 | | 1077 | | | | | | | | | | |
| | P initiator 17 | | 947 | | | | | | | | | | |
| Other initiator | Omnipol910 | | 910 | | | | | | | | | | |
| | TPO | | 348 | | | | | | | | | | |
| Sensitizer | Speedcure 7010 | | | 2 | 2 | 2 | 2 | 2 | 2 | 2 | 2 | 2 | 2 |
| | ITX | | | | | | | | | | | | |
| Polymerization inhibitor | UV22 | | | 0.5 | 0.5 | 0.5 | 0.5 | 0.5 | 0.5 | 0.5 | 0.5 | 0.5 | 0.5 |
| Gelling agent | UNISTER M-2222SL | | | | | | | | | | | | |
| | KAO WAX T1 | | | | | | | | | | | | |
| Pigment dispersion | Magenta mill base M | | | 15 | 15 | 15 | 15 | 15 | 15 | 15 | 15 | 15 | 15 |
| Monomer A (mass %) | | | | 32.5 | 72.5 | 52.5 | 22.5 | 12.5 | 0 | 32.5 | 32.5 | 32.5 | 32.5 |
| Monomer B (mass %) | | | | 47.5 | 0 | 27.5 | 57.5 | 67.5 | 80 | 47.5 | 47.5 | 47.5 | 47.5 |
| Monomer A + Monomer B (mass %) | | | | 80.0 | 72.5 | 80.0 | 80.0 | 80.0 | 80.0 | 80.0 | 80.0 | 80.0 | 80.0 |
| Compound (1) (mass %) | | | | 10 | 10 | 10 | 10 | 10 | 10 | 10 | 10 | 10 | 10 |
| Mass ratio [A/(A + B)] | | | | 0.41 | 1.00 | 0.66 | 0.28 | 0.16 | 0 | 0.41 | 0.41 | 0.41 | 0.41 |
| Mass ratio [(A + B)/(1)] | | | | 8 | 7.25 | 8 | 8 | 8 | 8 | 8 | 8 | 8 | 8 |
| Evaluation results | Image quality | | | 5 | 3 | 4 | 5 | 4 | 3 | 5 | 5 | 5 | 5 |
| | Residual monomer | | | 5 | 5 | 5 | 5 | 4 | 3 | 4 | 5 | 5 | 5 |
| | Adhesiveness | | | 5 | 5 | 5 | 5 | 4 | 3 | 5 | 5 | 5 | 5 |

TABLE 3

| Constituent | Type | Number of functional groups | Mw | Example 21 | Example 22 | Example 23 | Example 24 | Example 25 | Example 26 | Example 27 | Example 28 | Example 29 | Example 30 |
|---|---|---|---|---|---|---|---|---|---|---|---|---|---|
| Monomer A | EOTMPTA | 3 | 428 | | | | | | | | | | |
| | POTMPTA | 3 | 470 | | | | | | | | | | |
| | POGLTA | 3 | 480 | | | | | | | | | | |
| | PEGDA | 2 | 522 | 32.5 | | 41.5 | 39.5 | 37.5 | 27.5 | 22.5 | 22.5 | | 36.5 |
| | DPHA | 6 | 578 | | 32.5 | | | | | | | | |
| Monomer B | NA | 1 | 198 | | | | | | | | | | |
| | LA | 1 | 240 | | | | | | | | | | |
| | THFA | 1 | 156 | | | | | | | | | | |
| | NVC | 1 | 139 | | | | | | | | | | |
| | CTFA | 1 | 200 | | | | | | | | | | |
| | PEA | 1 | 192 | | | | | | | | | | |
| | STA | 1 | 325 | | | | | | | | | | |
| | TEGDVE | 2 | 202 | | | | | | | | | | |
| | MPDDA | 2 | 226 | | | | | | | | | 22.5 | |
| | PONPGDA | 2 | 328 | 20 | 20 | 20 | 20 | 20 | 20 | 20 | | | 20 |
| | TPGDA | 2 | 300 | 20 | 20 | 20 | 20 | 20 | 20 | 20 | | | 20 |
| Other monomer | DMAA | 1 | 119 | | | | | | | | 40 | 40 | |
| Specific initiator (compound (1)) | P initiator 2 | | 1035 | 10 | 10 | 1 | 3 | 5 | 15 | 20 | 20 | 20 | 5 |
| | P initiator 1 | | 944 | | | | | | | | | | |
| | P initiator 3 | | 2068 | | | | | | | | | | |
| | P initiator 4 | | 1569 | | | | | | | | | | |
| | P initiator 7 | | 984 | | | | | | | | | | |
| | P initiator 8 | | 916 | | | | | | | | | | |
| | P initiator 11 | | 1393 | | | | | | | | | | |
| | P initiator 12 | | 1161 | | | | | | | | | | |
| | P initiator 13 | | 1217 | | | | | | | | | | |
| | P initiator 16 | | 1077 | | | | | | | | | | |
| | P initiator 17 | | 947 | | | | | | | | | | |
| Other initiator | Omnipol910 | | 910 | | | | | | | | | | |
| | TPO | | 348 | | | | | | | | | | |
| Sensitizer | Speedcure 7010 | | | 2 | 2 | 2 | 2 | 2 | 2 | 2 | 2 | 2 | 2 |
| | ITX | | | | | | | | | | | | |

TABLE 3-continued

| Constituent | Type | Number of functional groups | Mw | Example 21 | Example 22 | Example 23 | Example 24 | Example 25 | Example 26 | Example 27 | Example 28 | Example 29 | Example 30 |
|---|---|---|---|---|---|---|---|---|---|---|---|---|---|
| Polymerization inhibitor | UV22 | | | 0.5 | 0.5 | 0.5 | 0.5 | 0.5 | 0.5 | 0.5 | 0.5 | 0.5 | 0.5 |
| Gelling agent | UNISTER M-2222SL | | | | | | | | | | | | 0.5 |
| | KAO WAX T1 | | | | | | | | | | | | 0.5 |
| Pigment dispersion | Magenta mill base M | | | 15 | 15 | 15 | 15 | 15 | 15 | 15 | 15 | 15 | 15 |
| | Monomer A (mass %) | | | 32.5 | 32.5 | 41.5 | 39.5 | 37.5 | 27.5 | 22.5 | 22.5 | 0 | 36.5 |
| | Monomer B (mass %) | | | 47.5 | 47.5 | 47.5 | 47.5 | 47.5 | 47.5 | 47.5 | 7.5 | 30 | 47.5 |
| | Monomer A + Monomer B (mass %) | | | 80.0 | 80.0 | 89.0 | 87.0 | 85.0 | 75.0 | 70.0 | 30.0 | 30.0 | 84.0 |
| | Compound (1) (mass %) | | | 10 | 10 | 1 | 3 | 5 | 15 | 20 | 20 | 20 | 5 |
| | Mass ratio [A/(A + B)] | | | 0.41 | 0.41 | 0.47 | 0.45 | 0.44 | 0.37 | 0.32 | 0.75 | 0 | 0.43 |
| | Mass ratio [(A + B)/(1)] | | | 8 | 8 | 89 | 29 | 17 | 5 | 3.5 | 1.5 | 1.5 | 16.8 |
| Evaluation results | Image quality | | | 5 | 5 | 3 | 3 | 4 | 5 | 5 | 4 | 3 | 5 |
| | Residual monomer | | | 5 | 5 | 3 | 3 | 4 | 5 | 4 | 3 | 3 | 4 |
| | Adhesiveness | | | 5 | 4 | 3 | 4 | 5 | 5 | 4 | 4 | 3 | 5 |

TABLE 4

| Constituent | Type | Number of functional groups | Mw | Example 31 | Example 32 | Example 33 | Example 34 | Example 35 | Example 36 | Example 37 | Example 38 | Example 39 | Example 40 |
|---|---|---|---|---|---|---|---|---|---|---|---|---|---|
| Monomer A | EOTMPTA | 3 | 428 | 32.5 | 32.5 | 32.5 | 32.5 | 32.5 | 32.5 | 32.5 | 32.5 | 32.5 | 32.5 |
| | POTMPTA | 3 | 470 | | | | | | | | | | |
| | POGLTA | 3 | 480 | | | | | | | | | | |
| | PEGDA | 2 | 522 | | | | | | | | | | |
| | DPHA | 6 | 578 | | | | | | | | | | |
| Monomer B | NA | 1 | 198 | | | | | | | | | | |
| | LA | 1 | 240 | | | | | | | | | | |
| | THFA | 1 | 156 | | | | | | | | | | |
| | NVC | 1 | 139 | | | | | | | | | | |
| | CTFA | 1 | 200 | | | | | | | | | | |
| | PEA | 1 | 192 | | | | | | | | | | |
| | STA | 1 | 325 | | | | | | | | | | |
| | TEGDVE | 2 | 202 | | | | | | | | | | |
| | MPDDA | 2 | 226 | | | | | | | | | | |
| | PONPGDA | 2 | 328 | 20 | 20 | 20 | 20 | 20 | 20 | 20 | 20 | 20 | 20 |
| | TPGDA | 2 | 300 | 20 | 20 | 20 | 20 | 20 | 20 | 20 | 20 | 20 | 20 |
| Other monomer | DMAA | 1 | 119 | | | | | | | | | | |
| Specific initiator (compound (1)) | P initiator 2 | | 1035 | | | | | | | | | | |
| | P initiator 1 | | 944 | 10 | | | | | | | | | |
| | P initiator 3 | | 2068 | | 10 | | | | | | | | |
| | P initiator 4 | | 1569 | | | 10 | | | | | | | |
| | P initiator 7 | | 984 | | | | 10 | | | | | | |
| | P initiator 8 | | 916 | | | | | 10 | | | | | |
| | P initiator 11 | | 1393 | | | | | | 10 | | | | |
| | P initiator 12 | | 1161 | | | | | | | 10 | | | |
| | P initiator 13 | | 1217 | | | | | | | | 10 | | |
| | P initiator 16 | | 1077 | | | | | | | | | 10 | |
| | P initiator 17 | | 947 | | | | | | | | | | 10 |
| Other initiator | Omnipol910 | | 910 | | | | | | | | | | |
| | TPO | | 348 | | | | | | | | | | |
| Sensitizer | Speedcure 7010 | | | 2 | 2 | 2 | 2 | 2 | 2 | 2 | 2 | 2 | 2 |
| | ITX | | | | | | | | | | | | |
| Polymerization inhibitor | UV22 | | | 0.5 | 0.5 | 0.5 | 0.5 | 0.5 | 0.5 | 0.5 | 0.5 | 0.5 | 0.5 |
| Gelling agent | UNISTER M-2222SL | | | | | | | | | | | | |
| | KAO WAX T1 | | | | | | | | | | | | |
| Pigment dispersion | Magenta mill base M | | | 15 | 15 | 15 | 15 | 15 | 15 | 15 | 15 | 15 | 15 |
| | Monomer A (mass %) | | | 32.5 | 32.5 | 32.5 | 32.5 | 32.5 | 32.5 | 32.5 | 32.5 | 32.5 | 32.5 |
| | Monomer B (mass %) | | | 47.5 | 47.5 | 47.5 | 47.5 | 47.5 | 47.5 | 47.5 | 47.5 | 47.5 | 47.5 |
| | Monomer A + Monomer B (mass %) | | | 80.0 | 80.0 | 80.0 | 80.0 | 80.0 | 80.0 | 80.0 | 80.0 | 80.0 | 80.0 |
| | Compound (1) (mass %) | | | 10 | 10 | 10 | 10 | 10 | 10 | 10 | 10 | 10 | 10 |
| | Mass ratio [A/(A + B)] | | | 0.41 | 0.41 | 0.41 | 0.41 | 0.41 | 0.41 | 0.41 | 0.41 | 0.41 | 0.41 |
| | Mass ratio [(A + B)/(1)] | | | 8 | 8 | 8 | 8 | 8 | 8 | 8 | 8 | 8 | 8 |
| Evaluation results | Image quality | | | 5 | 5 | 5 | 5 | 5 | 5 | 5 | 5 | 5 | 5 |
| | Residual monomer | | | 4 | 5 | 5 | 4 | 4 | 5 | 5 | 5 | 5 | 4 |
| | Adhesiveness | | | 5 | 5 | 5 | 5 | 5 | 5 | 5 | 5 | 5 | 5 |

TABLE 5

| Constituent | Type | Number of functional groups | Mw | Example 41 | Example 42 | Example 43 | Comparative Example 1 | Comparative Example 2 | Comparative Example 3 | Comparative Example 4 | Comparative Example 5 |
|---|---|---|---|---|---|---|---|---|---|---|---|
| Monomer A | EOTMPTA | 3 | 428 | 28.5 | 28.5 | 32.5 | 32.5 | | 32.5 | 72.5 | |
| | POTMPTA | 3 | 470 | | | | | | | | |
| | POGLTA | 3 | 480 | | | | | | | | |
| | PEGDA | 2 | 522 | | | | | | | | |
| | DPHA | 6 | 578 | | | | | | | | |
| Monomer B | NA | 1 | 198 | | | | | | | | 72.5 |
| | LA | 1 | 240 | | | | | | | | |
| | THFA | 1 | 156 | | | | | | | | |
| | NVC | 1 | 139 | | | | | | | | |
| | CTFA | 1 | 200 | | | | | | | | |
| | PEA | 1 | 192 | | | | | | | | |
| | STA | 1 | 325 | | | | | | | | |
| | TEGDVE | 2 | 202 | | | | | | | | |
| | MPDDA | 2 | 226 | | | | | | | | |
| | PONPGDA | 2 | 328 | 20 | 20 | 20 | 20 | | 20 | | |
| | TPGDA | 2 | 300 | 20 | 20 | 20 | 20 | | 20 | | |
| Other monomer | DMAA | 1 | 119 | | | | | 72.5 | | | |
| Specific initiator (compound (1)) | P initiator 2 | | 1035 | 10 | 10 | 10 | | 10 | | | |
| | P initiator 1 | | 944 | | | | | | | | |
| | P initiator 3 | | 2068 | | | | | | | | |
| | P initiator 4 | | 1569 | | | | | | | | |
| | P initiator 7 | | 984 | | | | | | | | |
| | P initiator 8 | | 916 | | | | | | | | |
| | P initiator 11 | | 1393 | | | | | | | | |
| | P initiator 12 | | 1161 | | | | | | | | |
| | P initiator 13 | | 1217 | | | | | | | | |
| | P initiator 16 | | 1077 | | | | | | | | |
| | P initiator 17 | | 947 | | | | | | | | |
| Other initiator | Omnipol910 | | 910 | | 4 | | | | 10 | | |
| | TPO | | 348 | 4 | | | 10 | | | 10 | 10 |
| Sensitizer | Speedcure 7010 | | | 2 | 2 | | 2 | 2 | 2 | 2 | 2 |
| | ITX | | | | | 2 | | | | | |
| Polymerization inhibitor | UV22 | | | 0.5 | 0.5 | 0.5 | 0.5 | 0.5 | 0.5 | 0.5 | 0.5 |
| Gelling agent | UNISTER M-2222SL | | | | | | | | | | |
| | KAO WAX T1 | | | | | | | | | | |
| Pigment dispersion | Magenta mill base M | | | 15 | 15 | 15 | 15 | 15 | 15 | 15 | 15 |
| | Monomer A (mass %) | | | 28.5 | 28.5 | 32.5 | 32.5 | 0 | 32.5 | 72.5 | 0 |
| | Monomer B (mass %) | | | 47.5 | 47.5 | 47.5 | 47.5 | 0 | 47.5 | 7.5 | 80 |
| | Monomer A + Monomer B (mass %) | | | 76.0 | 76.0 | 80.0 | 80.0 | 0 | 80.0 | 80.0 | 80.0 |
| | Compound (1) (mass %) | | | 10 | 10 | 10 | 10 | 10 | 0 | 0 | 0 |
| | Mass ratio [A/(A + B)] | | | 0.38 | 0.38 | 0.41 | 0.41 | 0 | 0.41 | 0.91 | 0 |
| | Mass ratio [(A + B)/(1)] | | | 7.6 | 7.6 | 8 | — | 0 | — | — | — |
| Evaluation results | Image quality | | | 4 | 5 | 4 | 1 | 2 | 2 | 1 | 1 |
| | Residual monomer | | | 4 | 4 | 4 | 1 | 1 | 2 | 1 | 1 |
| | Adhesiveness | | | 4 | 4 | 4 | 1 | 1 | 1 | 1 | 1 |

Description of Tables 1 to 5

In Tables 1 to 5, "Number of functional groups" refers to the number of the functional groups included in a photopolymerizable monomer (i.e., the monomer A, the monomer B, or the other monomer), and "Mw" refers to the molecular weight of a photopolymerizable monomer (i.e., the monomer A, the monomer B, or the other monomer) or a photopolymerization initiator (i.e., the specific initiator (compound (1)) or the other initiator).

The values in each of the rows of the constituents are the mass percentages of the constituent relative to the total amounts of the inks. The blanks mean that the ink did not contain the corresponding constituents.

The meanings of the abbreviations used in Tables 1 to 5 are as follows.

Monomer A

EOTMPTA . . . Ethyleneoxy-modified trimethylolpropane triacrylate (number of ethyleneoxy groups: 3), "SR454" produced by Sartomer POTMPTA . . . Propyleneoxy-modified trimethylolpropane triacrylate (number of propyleneoxy groups: 3), "ARONIX M-310" produced by Toagosei Co., Ltd.

POGLTA . . . Propyleneoxy-modified glycerol triacrylate (number of propyleneoxy groups: 3), "OTA 480" produced by DAICEL-ALLNEX LTD.

PEGDA . . . Polyethylene glycol diacrylate, "SR344" produced by Sartomer

DPHA . . . Dipentaerythritol hexaacrylate, "DPHA" produced by Sartomer

Monomer B

NA . . . n-Nonyl acrylate

LA . . . n-Lauryl acrylate

THFA . . . Tetrahydrofurfuryl acrylate

NVC . . . N-vinylcaprolactam

CTFA . . . Cyclic trimethylolpropane formal acrylate, "SR531" produced by Sartomer PEA . . . 2-Phenoxyethyl acrylate STA . . . n-Stearyl acrylate TEGDVE . . . Triethylene glycol divinyl ether, "DVE-3" produced by BASF SE MPDDA . . . 3-Methyl-1,5-pentanediol diacrylate PONPGDA . . . Propyleneoxy-modified neopentyl glycol diacrylate (number of propyleneoxy groups: 2), "SR9003" produced by Sartomer TPGDA . . . Tripropylene glycol diacrylate, "Biscoat #310 HP" produced by Osaka Organic Chemical Industry Ltd.

Other Monomers

DMAA . . . Dimethylacrylamide

Specific Initiator (Compound (1))

P initiators 1, 2, 3, 4, 7, 8, 11, 12, 13, 16, and 17 . . . Specific examples of the specific initiator (compound (1)) (i.e., compound represented by Formula (1))

Details of the other initiators, the sensitizers, the polymerization inhibitor, and the gelling agent are as follows.

Omnipol 910 . . . "Omnipol 910" produced by IGM Resins B.V., the compound represented by Formula (X) above TPO . . . "Omnirad TPO" produced by IGM Resins B.V., 2,4,6-trimethylbenzoyl diphenylphosphine oxide Speedcure 7010 . . . "Speedcure 7010" produced by Lambson, 1,3-di({α-[1-chloro-9-oxo-9H-thioxanthen-4-yl]oxy}acetylpoly [oxy(l-methylethylene)]oxy)-2,2-bis({α-[1-chloro-9-oxo-9H-thioxanthen-4-yl]oxy}acetylpoly [oxy(l-methylethylene)]oxymethyl)propane (CAS No. 1003567-83-6)

ITX . . . 2-Isopropylthioxanthone

UV22 . . . "IRGASTAB UV-22" produced by BASF SE, quinone polymerization inhibitor UNISTER M-2222SL . . . "UNISTER (registered trademark) M-2222SL" produced by NOF CORPORATION, behenyl behenate KAO WAX T1 . . . "KAO WAX T1" produced by Kao Corporation, distearyl ketone As described in Tables 1 to 5, in Examples 1 to 43, where an ink including the photopolymerization initiator including the specific initiator (compound (1)) and at least one of the monomer A composed of a photopolymerizable monomer having a molecular weight of 400 or more or the monomer B composed of a photopolymerizable monomer having a molecular weight of 130 or more and less than 400 was used, the quality and adhesiveness of the resulting image were excellent. In addition, the amount of residual monomer in the image was reduced.

In contrast, in Comparative Examples 1 and 3 to 5, where an ink that did not include the specific initiator was used, the quality and adhesiveness of the resulting image became degraded. In addition, the amount of residual monomer in the image was increased.

Moreover, in Comparative Example 2, where an ink that included the specific initiator but did not include either the monomer A or B was used, the quality and adhesiveness of the resulting image became degraded. In addition, the amount of residual monomer in the image was increased.

The results obtained in Examples 12 and 13 show that the image formed in Example 13, where an ink including both monomers A and B was used, had higher quality than the image formed in Example 12, where an ink that included the monomer A but did not include the monomer B was used.

The results obtained in Examples 15 and 16 show that the image formed in Example 15, where an ink including both monomers A and B was used, had higher quality and higher adhesiveness than the image formed in Example 16, where an ink that included the monomer B but did not include the monomer A was used, and the amount of the residual monomer in the image formed in Example 15 was smaller than the amount of the residual monomer in the image formed in Example 16.

The results obtained in Examples 12 to 15 show that the images formed in Examples 13 to 15, where the mass ratio [A/(A+B)] (i.e., the mass ratio of the content of the monomer A to the total content of the monomers A and B) was 0.10 to 0.70, had higher quality than the image formed in Example 12, where the mass ratio [A/(A+B)] was more than 0.70.

The results obtained in Examples 14 and 15 show that the image formed in Example 14, where the mass ratio [A/(A+B)] was 0.20 or more, had higher quality and higher adhesiveness than the image formed in Example 15, where the mass ratio [A/(A+B)] was less than 0.20, and the amount of the residual monomer in the image formed in Example 14 was smaller than the amount of the residual monomer in the image formed in Example 15.

The results obtained in Examples 18 to 22 show that the adhesiveness of the image is further enhanced in the case (Examples 18 to 21) where the monomer A includes at least one selected from the group consisting of ethyleneoxy-modified trimethylolpropane tetraacrylate,
propyleneoxy-modified trimethylolpropane tetraacrylate,
propyleneoxy-modified glycerol triacrylate, and
polyethylene glycol diacrylate.

The results obtained in Examples 1 to 11 show that the amount of residual monomer that remains in the image is further reduced in the case (Examples 4 to 11) where the monomer B includes at least one selected from the group consisting of N-vinylcaprolactam,
cyclic trimethylolpropane formal acrylate,
phenoxyethyl acrylate,
stearyl acrylate,
3-methyl-1,5-pentanediol diacrylate,
propyleneoxy-modified neopentyl glycol diacrylate,
tripropylene glycol diacrylate, and
triethylene glycol divinyl ether.

The results obtained in Examples 23 to 27 show that the images formed in Examples 25 to 27, where the mass ratio [(A+B)/(1)] (i.e., the mass ratio of the total content of the monomers A and B to the content of the compound represented by Formula (1)) was 2 to 20, had higher quality than the images formed in Examples 23 and 24, where the mass ratio [(A+B)/(1)] was more than 20, and the amounts of the residual monomer in the images formed in Examples 25 to 27 were smaller than the amounts of the residual monomer in the images formed in Examples 23 and 24.

The results obtained in Examples 26 and 27 show that the image formed in Example 26, where the mass ratio [(A+B)/(1)] was 4 or more, had higher adhesiveness than the image formed in Example 27, where the mass ratio [(A+B)/(1)] was less than 4, and the amount of the residual monomer in the image formed in Example 26 was smaller than the amount of the residual monomer in the image formed in Example 27.

In Examples above, a magenta ink was used as an example of the ink according to the present disclosure. It should be understood that the advantageous effects shown in Examples above can also be achieved in the case where an ink other than a magenta ink is used, as long as the other ink satisfies the conditions of the ink according to the present disclosure.

It should also be understood that the advantageous effects shown in Examples above can also be achieved in the case where a multi-color image is recorded by forming an ink film of a first color using an example of the ink according to the present disclosure, performing pinning exposure of the first-color ink film, applying second and later inks that include a photopolymerizable monomer, a photopolymerization initiator, and a colorant onto the first-color ink film such that the second and later inks overlap at least a part of the first-color ink film to form ink films of the second and later colors, and performing full exposure of the first-color ink film and the ink films of the second and later colors.

Japanese Patent Application No. 2019-204276 filed on Nov. 11, 2019, is incorporated herein by reference in its entirety.

All documents, patent applications, and technical standards referred to herein are incorporated herein by reference in their entirety to the same extent as when the individual documents, patent applications, and technical standards are specifically and individually indicated to be incorporated by reference in its entirety.

What is claimed is:

1. An active energy ray-curable ink comprising:
a photopolymerization initiator including a compound represented by Formula (1); and
at least one of a monomer A composed of a photopolymerizable monomer having a molecular weight of 400 or more or a monomer B composed of a photopolymerizable monomer having a molecular weight of 130 or more and less than 400,
wherein the monomer A is at least one selected from the group consisting of polyfunctional acrylates including at least one of an ethyleneoxy group, a propyleneoxy group, a trimethylolpropane skeleton, a glycerol skeleton, or a dipentaerythritol skeleton,
wherein the monomer B is at least one selected from the group consisting of
a monofunctional acrylate including at least one of a heterocyclic skeleton, an aromatic ring skeleton, a chain alkyl group having 9 or more carbon atoms, a polyethyleneoxy group, or a polypropyleneoxy group,
an N-vinyl compound including one vinyl group,
a difunctional acrylate including at least one of a chain alkylene group having 5 or more carbon atoms, a polyethyleneoxy group, or a polypropyleneoxy group, and
a divinyl ether including at least one of a polyethyleneoxy group or a polypropyleneoxy group, and

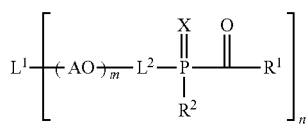
(1)

wherein
$L^1$ represents an organic group having 20 or less carbon atoms and a valence of n,
n represents an integer of 3 to 8,
AO represents an alkyleneoxy group having 2 or 3 carbon atoms,
m represents an integer of 0 to 15,
$L^2$ represents a single bond, an oxygen atom, a sulfur atom, or —$NR^{11}$—,
$R^{11}$ represents a hydrogen atom or an alkyl group having 1 to 3 carbon atoms,
X represents an oxygen atom or a sulfur atom, n $R^1$'s each independently represent a phenyl group, a 2,6-dichlorophenyl group, a 2,4,6-trichlorophenyl group, a 2,6-dimethylphenyl group, a 2,4,6-trimethylphenyl group, a 2,6-diethylphenyl group, a 2,6-dimethoxyphenyl group, a 2,6-diethoxyphenyl group, an α-naphthyl group, a 2,6-dinitrophenyl group, a 2,6-dimethylcyclohexyl group, a 2,6-diethylcyclohexyl group, a 2,6-dimethoxycyclohexyl group, a 2,6-diethoxycyclohexyl group, a 2,6-dichlorocyclohexyl group, a tert-butyl group, a pentyl group, a hexyl group, a heptyl group, an octyl group, or a 2-ethylhexyl group, and n $R^2$'s each independently represent $R^1$—(C=O)—, a methyl group, an ethyl group, a propyl group, an isopropyl group, an n-butyl group, a sec-butyl group, a tert-butyl group, a pentyl group, a hexyl group, a 2-ethylhexyl group, a phenyl group, a xylyl group, a 4-biphenyl group, a 2-chlorophenyl group, a 3-chlorophenyl group, a 4-chlorophenyl group, a 2,4-dichlorophenyl group, a 2-methylphenyl group, a 3-methylphenyl group, a 4-methylphenyl group, a 2-ethylphenyl group, a 3-ethylphenyl group, a 4-ethylphenyl group, a 2-methoxyphenyl group, a 3-methoxyphenyl group, a 4-methoxyphenyl group, a 2,4-dimethoxyphenyl group, a 2-ethoxyphenyl group, a 3-ethoxyphenyl group, a 4-ethoxyphenyl group, an α-naphthyl group, a methylnaphthyl group, a chloronaphthyl group, an ethoxynaphthyl group, a 2-nitrophenyl group, or a 4-nitrophenyl group.

2. The active energy ray-curable ink according to claim 1, comprising both of the monomers A and B.

3. The active energy ray-curable ink according to claim 2, wherein a mass ratio of a content of the monomer A to a total content of the monomers A and B is 0.10 to 0.70.

4. The active energy ray-curable ink according to claim 1, wherein a total content of the monomers A and B is 20% by mass or more of a total amount of the active energy ray-curable ink.

5. The active energy ray-curable ink according to claim 1, wherein the monomer A includes at least one selected from the group consisting of
ethyleneoxy-modified trimethylolpropane tetraacrylate,
propyleneoxy-modified trimethylolpropane tetraacrylate,
propyleneoxy-modified glycerol triacrylate,
polyethylene glycol diacrylate, and
dipentaerythritol hexaacrylate; and
wherein the monomer B includes at least one selected from the group consisting of
nonyl acrylate,
lauryl acrylate,
stearyl acrylate,
tetrahydrofurfuryl acrylate,
N-vinylcaprolactam,
cyclic trimethylolpropane formal acrylate,
phenoxyethyl acrylate,
3-methyl-1,5-pentanediol diacrylate,
propyleneoxy-modified neopentyl glycol diacrylate,
tripropylene glycol diacrylate, and
triethylene glycol divinyl ether.

6. The active energy ray-curable ink according to claim 1, comprising the monomer A,
wherein the monomer A includes at least one selected from the group consisting of
ethyleneoxy-modified trimethylolpropane tetraacrylate,
propyleneoxy-modified trimethylolpropane tetraacrylate,
propyleneoxy-modified glycerol triacrylate, and
polyethylene glycol diacrylate.

7. The active energy ray-curable ink according to claim 1, comprising the monomer B,
wherein the monomer B includes at least one selected from the group consisting of
N-vinylcaprolactam,
cyclic trimethylolpropane formal acrylate,
phenoxyethyl acrylate,
stearyl acrylate,
3-methyl-1,5-pentanediol diacrylate,
propyleneoxy-modified neopentyl glycol diacrylate,
tripropylene glycol diacrylate, and
triethylene glycol divinyl ether.

8. The active energy ray-curable ink according to claim 1,
wherein a mass ratio of a total content of the monomers A and B to a content of the compound represented by Formula (1) is 2 to 20.

9. The active energy ray-curable ink according to claim 1, further comprising:
a gelling agent that is at least one selected from the group consisting of an ester compound including a chain alkyl group having 12 or more carbon atoms and a ketone compound including a chain alkyl group having 12 or more carbon atoms.

10. An image recording method comprising:
an application step of applying the active energy ray-curable ink according to claim 1 to a recording medium to form an ink film; and
an irradiation step of irradiating the ink film with an active energy ray.

11. The image recording method according to claim 10,
wherein the irradiation step includes a substep of irradiating the ink film with the active energy ray in an atmosphere having an oxygen concentration of 5% by volume or less.

* * * * *